United States Patent
Nakadai et al.

(10) Patent No.: US 10,869,148 B2
(45) Date of Patent: Dec. 15, 2020

(54) AUDIO PROCESSING DEVICE, AUDIO PROCESSING METHOD, AND PROGRAM

(71) Applicant: HONDA MOTOR CO., LTD., Tokyo (JP)

(72) Inventors: Kazuhiro Nakadai, Wako (JP); Daniel Patrik Gabriel, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/548,288

(22) Filed: Aug. 22, 2019

(65) Prior Publication Data
US 2020/0077218 A1   Mar. 5, 2020

(30) Foreign Application Priority Data
Sep. 4, 2018  (JP) .................. 2018-165365

(51) Int. Cl.
*H04S 7/00*   (2006.01)
*H04R 5/04*   (2006.01)
*G06N 7/00*   (2006.01)

(52) U.S. Cl.
CPC ............... *H04S 7/30* (2013.01); *G06N 7/005* (2013.01); *H04R 5/04* (2013.01); *H04S 2400/01* (2013.01)

(58) Field of Classification Search
CPC ....... H04S 7/30; H04S 2420/01; G06N 7/005; H04R 5/04
See application file for complete search history.

(56) References Cited

U.S. PATENT DOCUMENTS

2013/0142342 A1* 6/2013 Del Galdo ............. H04R 3/005
381/56

FOREIGN PATENT DOCUMENTS

JP       2009246827    * 10/2009

OTHER PUBLICATIONS

Daniel Gabriel, et.al., "Iterative Outlier Removal Method Using In-Cluster Variance Changes in Multi-Microphone Array Sound Source Localization", The Proceedings of the 79th National Convention of IPSJ, pp. 229-230, Nagoya University, Nagoya. Mar. 16-18, 2017, 2 pages.

* cited by examiner

*Primary Examiner* — Regina N Holder
(74) *Attorney, Agent, or Firm* — Rankin, Hill & Clark LLP

(57) ABSTRACT

An audio processing device includes: a sound source localizing unit configured to determine a localized sound source direction, which is a direction of a sound source, on the basis of audio signals of a plurality of channels acquired from M (here, M is an integer equal to or greater than "3") sound receiving units of which positions are different from each other; and a sound source position estimating unit configured to, for each set of two sound receiving units, estimate a midpoint of a segment perpendicular to both of half lines directed in estimated sound source directions, which are directions from the sound receiving units to an estimated sound source position of the sound source, as the estimated sound source position.

9 Claims, 19 Drawing Sheets

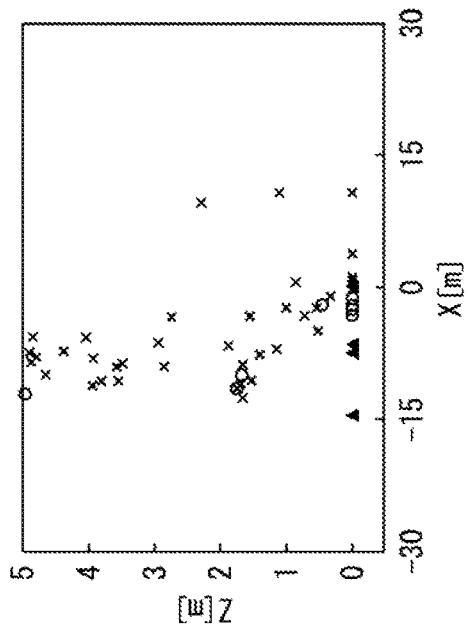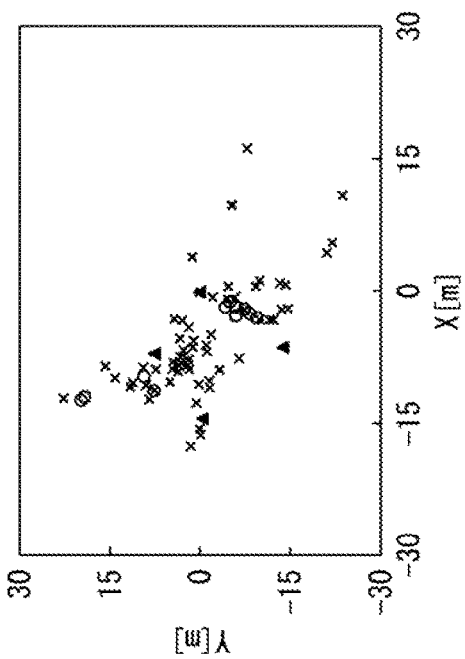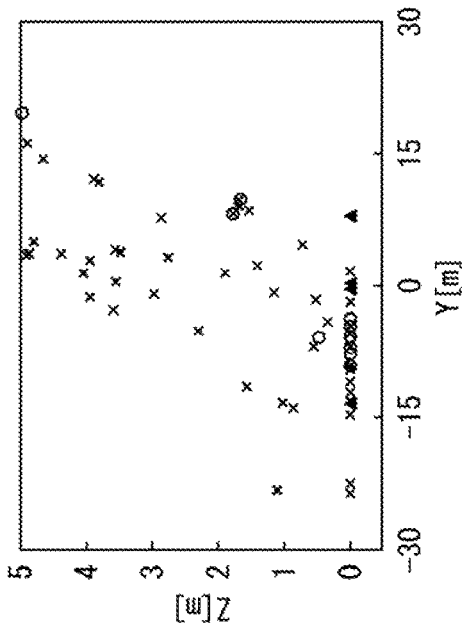
FIG. 22

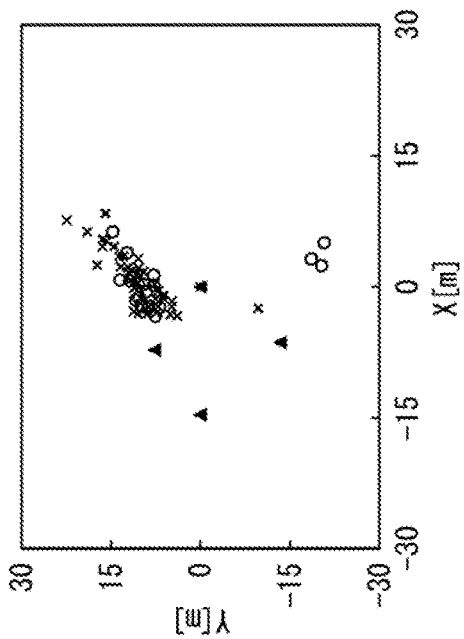
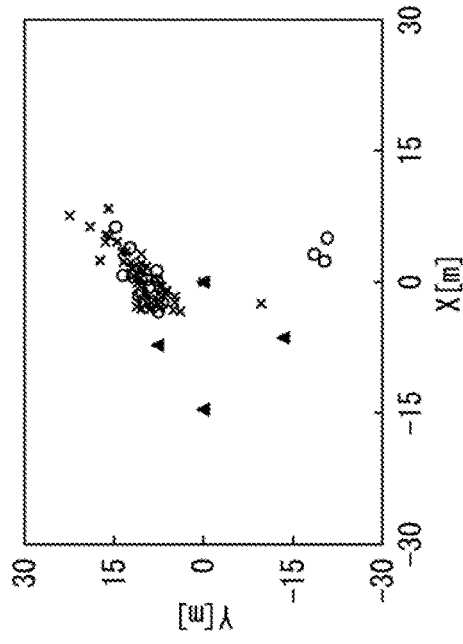
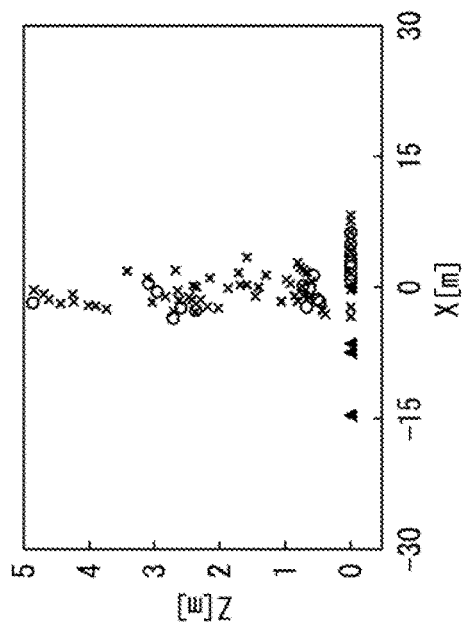
FIG. 24

AUDIO PROCESSING DEVICE, AUDIO PROCESSING METHOD, AND PROGRAM

CROSS-REFERENCE TO RELATED APPLICATION

Priority is claimed on Japanese Patent Application No. 2018-165365, filed Sep. 4, 2018, the content of which is incorporated herein by reference.

BACKGROUND OF THE INVENTION

Field of the Invention

The present invention relates to an audio processing device, an audio processing method, and a program.

Description of Related Art

In understanding an environment, it is important to acquire information of a sound environment. Conventionally, in order to detect a specific sound source from various sound sources and noise in a sound environment, elemental technologies such as sound source localization, sound source separation, and sound source identification have been proposed. A specific sound source, for example, is sound that is useful for a listener who is a user using a device such as a birdcall of a bird or the speech of a person. Sound source localization represents estimation of a direction and a position of a sound source. The direction and the position of a sound source that have been estimated become clues in sound source separation and sound source identification. In addition, sound source separation represents separation of a plurality of sounds. Sound source identification represents identification of a sound source.

In such sound source separation and sound source localization, a voice signal is received using a microphone array including a plurality of microphones. In such a microphone array, sound arrival time differences of the microphones are different.

Accordingly, a device can acquire a direction of a sound source.

Meanwhile, automatic execution of processes of identifying a kind of bird and a direction from which the bird is calling and the like has been researched. In the sound source localization of such a bird, the size of the bird is small, and the movement of the bird is quick, and accordingly, estimation of a position is more preferable than estimation of a direction.

For this reason, in Non-Patent Document 1 (Daniel Gabriel, et. al., "Iterative Outlier Removal Method Using In-Cluster Variance Changes in Multi-Microphone Array Sound Source Localization," The Proceedings of The 79th National Convention of IPSJ, pp. 2-229-230, Nagoya University, Nagoya, Mar. 16-18, 2017.), a triangulation technique for acquiring a two-dimensional sound source position using azimuth angle data is disclosed.

SUMMARY OF THE INVENTION

However, in the technology described in Non-Patent Document 1, sound sources that are positioned in the same direction and are present at positions having different heights cannot be distinguished from each other.

An aspect according to the present invention is in consideration of the problems described above, and an objective thereof is to provide an audio processing device, an audio processing method, and a program capable of estimating a position of a sound source in directions in three dimensions with high accuracy.

In order to solve the problems described above, the present invention employs the following forms.

(1) According to one aspect of the present invention, an audio processing device is provided including: a sound source localizing unit configured to determine a localized sound source direction, which is a direction of a sound source, on the basis of audio signals of a plurality of channels acquired from M (here, M is an integer equal to or greater than "3") sound receiving units of which positions are different from each other; and a sound source position estimating unit configured to, for each set of two sound receiving units, estimate a midpoint of a segment perpendicular to both of half lines directed in estimated sound source directions, which are directions from the sound receiving units to an estimated sound source position of the sound source, as the estimated sound source position.

(2) In the aspect (1) described above, the sound source position estimating unit may classify a distribution of the midpoints into a plurality of clusters and update the estimated sound source position such that an estimation probability, which is a probability of the estimated sound source position being classified into a cluster corresponding to the sound source, increases.

(3) In the aspect (2) described above, the estimation probability may be a product having a first probability that is a probability of acquiring the estimated sound source direction when the localized sound source direction is determined, a second probability that is a probability of acquiring the estimated sound source position when the midpoint is determined, and a third probability that is a probability of appearance of a cluster into which the midpoint is classified as factors.

(4) In the aspect (3) described above, the first probability may follow a von-Mises distribution having the localized sound source direction as a reference, and the second probability may follow a multi-dimensional Gaussian function having a position of the midpoint as a reference, and the sound source position estimating unit may update a shape parameter of the von-Mises distribution and an average and dispersion of the multi-dimensional Gaussian function such that the estimation probability increases.

(5) In any one of the aspects (1) to (4) described above, the sound source position estimating unit may set a center of gravity of three midpoints determined from three sound receiving units as an initial value of the estimated sound source position.

(6) In any one of the aspects (1) to (5) described above, a sound source separating unit configured to separate the audio signals of the plurality of channels into individual sound source signals for sound sources, a frequency analyzing unit configured to calculate spectrums of the individual sound source signals, and a sound source identifying unit configured to classify the spectrums into a plurality of second clusters, determine whether or not sound sources relating to the spectrums that are classified into the second clusters are the same, and select the estimated sound source position of sound sources determined to be the same with priority over sound sources determined not to be the same may be further included.

(7) In the aspect (6) described above, the sound source identifying unit may evaluate a stability of a second cluster on the basis of a dispersion of the estimated sound source positions of the sound sources relating to the spectrums classified into each second cluster and select the estimated sound source position of the sound source of which the spectrum is classified into the second cluster with higher priority when the second cluster has a higher stability.

(8) According to one aspect of the present invention, an audio processing method is provided in an audio processing device, the audio processing method including: a sound source localizing process of determining a localized sound source direction, which is a direction of a sound source, on the basis of audio signals of a plurality of channels acquired from M (here, M is an integer equal to or greater than "3") sound receiving units of which positions are different from each other; and a sound source position estimating process of estimating a midpoint of a segment perpendicular to both of half lines directed in estimated sound source directions for each set of two sound receiving units, which are directions from the sound receiving units to an estimated sound source position of the sound source, as the estimated sound source position.

(9) According to one aspect of the present invention, there is provided a computer-readable non-transitory storage medium storing a program thereon, the program causing a computer of an audio processing device to execute: a sound source localizing sequence of determining a localized sound source direction, which is a direction of a sound source, on the basis of audio signals of a plurality of channels acquired from M (here, M is an integer equal to or greater than "3") sound receiving units of which positions are different from each other; and a sound source position estimating sequence of estimating a midpoint of a segment perpendicular to both of half lines directed in estimated sound source directions for each set of two sound receiving units, which are directions from the sound receiving units to an estimated sound source position of the sound source, as the estimated sound source position.

According to the aspect (1), (8), or (9) described above, although half lines directed in the localized sound source direction from sound receiving units different from each other do not intersect each other, a point determined using a midpoint of a segment perpendicular to both of the half lines can be estimated as an estimated sound source position.

According to the aspect (2) described above, the estimated sound source position is adjusted such that the probability of the estimated sound source position of a corresponding sound source being classified into the range of a cluster into which a midpoint set in accordance with the localized sound source directions from sound receiving units different from each other is classified increases. Since the probability of a sound source being present within the range of the cluster becomes high, the estimated sound source position that is adjusted can be acquired as a more accurate sound source position.

Generally, while the localized sound source direction, the estimated sound source position, and the midpoint are interdependent, the sound source position estimating unit according to the aspect (3) described above can determine an estimated sound source position using the first probability, the second probability, and the third probability as factors of estimation probabilities that are independent. For this reason, according to the aspect (3) described above, a calculation load relating to the adjustment of the estimated sound source position is reduced.

According to the aspect (4) described above, each of the function of the estimated sound source direction of the first probability and the function of the estimated sound source position of the second probability is represented by a small number of parameters such as the shape parameter or the average and the dispersion. For this reason, a calculation load relating to the adjustment of the estimated sound source position can be further reduced.

According to the aspect (5) described above, the initial value of the estimated sound source position can be set inside of an area of a triangle having three midpoints at which there is a high probability of presence of a sound source as its vertexes. For this reason, a calculation load until a change in the estimated sound source position according to adjustment converges is reduced.

According to the aspect (6) described above, the probability of an estimated sound source position, which is estimated on the basis of a midpoint in the localized sound source directions of sound sources determined not to be the same on the basis of the spectrum, being rejected increases.

For this reason, the probability of an estimated sound source position being erroneously selected as a virtual image on the basis of a midpoint in the estimated sound source directions of sound sources that are different from each other can be lowered.

According to the aspect (7) described above, the probability of an estimated sound source position of a sound source corresponding to a second cluster into which a spectrum of a sound source of which an estimated sound source position is stationary is classified being selected becomes high. In other words, the probability of an estimated sound source position estimated on the basis of a midpoint in estimated sound source directions of mutually-different sound sources accidently being included in a second cluster in which the estimated sound source position is selected is lowered. For this reason, the probability of erroneously selecting an estimated sound source position as a virtual image on the basis of a midpoint in the estimated sound source directions of mutually-different sound sources can be further lowered.

BRIEF DESCRIPTION OF THE DRAWINGS

FIG. 22 is an example illustrating positions of birds estimated on the basis of the audio signal illustrated in FIG. 20.

FIG. 24 is a diagram illustrating a result of a comparison between a result of estimation of position in two dimensions according to a conventional technology and a result of estimation of a position in three dimensions according to this embodiment.

DETAILED DESCRIPTION OF THE INVENTION

Figure 1:
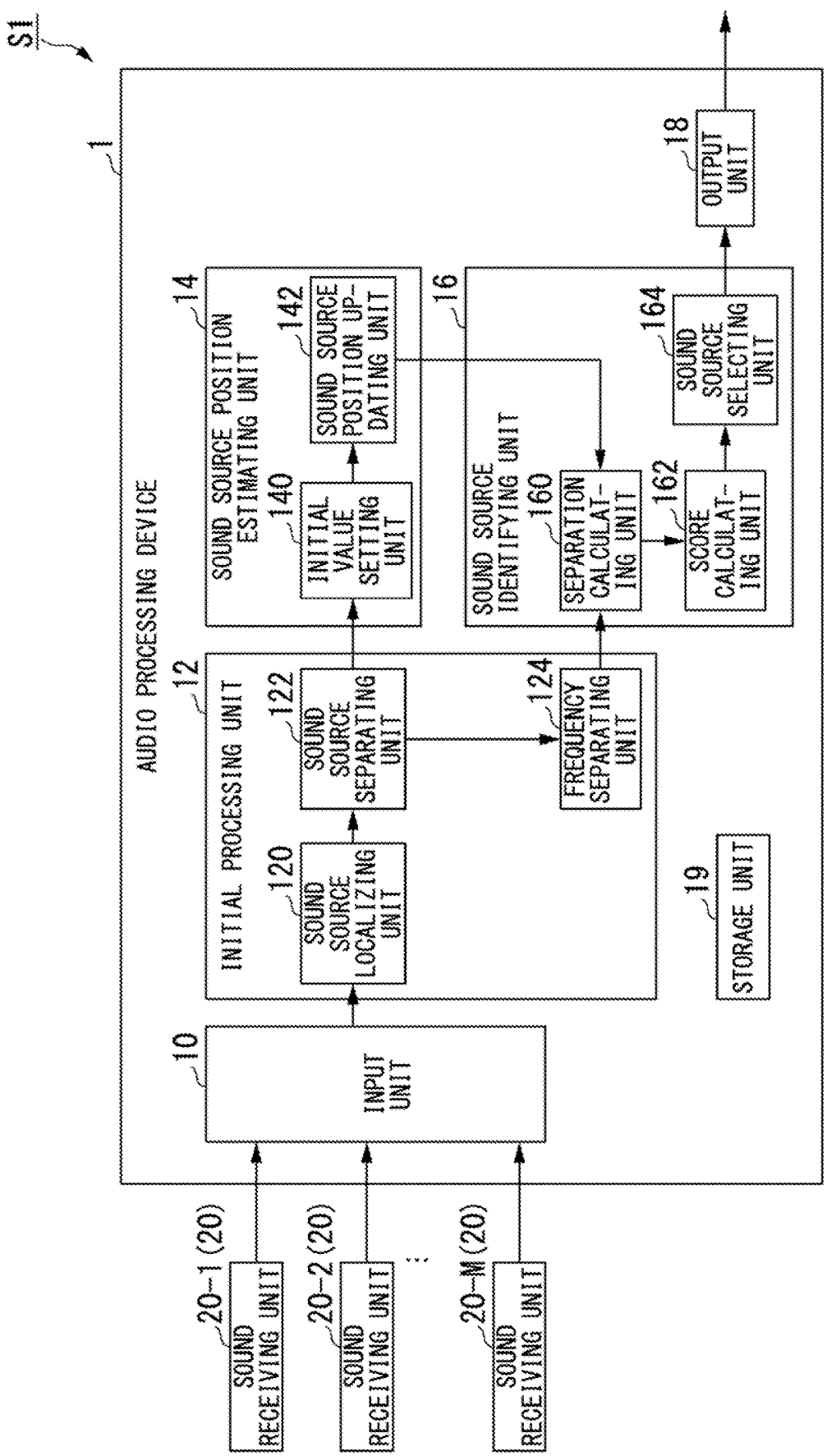
FIG. 1 is a block diagram illustrating the configuration of an audio processing system according to this embodiment.

Hereinafter, an embodiment of the present invention will be described with reference to the drawings. In the drawings used for the following description, scaling factors for respective members may be appropriately changed to allow respective members to have recognizable sizes.

(Problem in Sound Source Localization Using a Microphone Array Using Two-Dimensionally Arranged Microphones)

Here, problems in sound source localization using a microphone array that uses two-dimensionally arranged microphones will be described.

In a microphone array for performing estimation of position in two dimensions, a plurality of microphones are disposed in a horizontal direction in which there are no differences in an elevation angle between microphones.

In a case in which sound is received using such a microphone array, information of the sound source in a height direction cannot be acquired.

(Audio Processing System)

FIG. 1 is a block diagram illustrating the configuration of an audio processing system S1 according to this embodiment. As illustrated in FIG. 1, the audio processing system S1 is configured to include an audio processing device 1 and M sound receiving units 20. The sound receiving units 20 include sound receiving units 20-1, 20-2, . . . , 20-M.

In the following description, a subject for an audio signal to be received is a birdcall of a wild bird, and a sound reception place is a field. In addition, position estimation also including a height direction according to this embodiment will be referred to as position estimation in three dimensions.

The audio processing device 1 performs sound source localization for audio signals of a plurality of channels acquired from M sound receiving units 20 and estimates a localized sound source direction that is a sound source direction of each sound source. The audio processing device 1, for each set of two sound receiving units among M sound receiving units 20, sets midpoints (included intersections) of segments that are perpendicular to both of half lines from positions of the sound receiving units 20 to an estimated sound source direction of each sound source (segments representing distances between two lines). An estimated sound source direction represents a direction of a sound source that is estimated from each sound receiving unit 20. An estimated position of a sound source will be referred to as an estimated sound source position. The audio processing device 1 performs clustering of a distribution of set midpoints (included intersections) and classifies the midpoints into a plurality of clusters. The audio processing device 1 updates an estimated sound source position such that an estimation probability that is a probability of being classified into a cluster corresponding to the sound source becomes high. A process performed by the audio processing device 1 will be described later.

M sound receiving units 20 are disposed at mutually-different positions. Each of the sound receiving units 20 receives sound that has arrived at the unit and generates audio signals of Q (here, Q is an integer equal to or greater than "2") channels from the received sound. Each of the sound receiving units 20, for example, is a microphone array configured to include Q microphones (electro-acoustic conversion devices) disposed at mutually-different positions inside a predetermined area. In each of the sound receiving units 20, the shape of the area in which microphones are disposed is arbitrary. The shape of the area may be any one of a quadrangle, a circle, a sphere, an oval, and the like. Each of the sound receiving units 20 outputs the acquired audio signals of Q channels to the audio processing device 1. Each of the sound receiving units 20 may include an input/output interface used for transmitting audio signals of Q channels in a wireless or wired manner. While each sound receiving unit 20 occupies a predetermined space, unless otherwise mentioned, a position of the sound receiving unit 20 represents a position of one point (for example, the center of gravity) representing the space. In addition, the sound receiving unit 20 converts audio signals of Q channels from analog signals to digital signals using signals having the same sampling frequency and outputs the audio signals of Q channels converted into the digital signals to the audio processing device 1.

The sound receiving unit 20 may be referred to as a microphone array m. In addition, each microphone array m may be distinguished by assigning an index k or the like as in a microphone array mk or the like.

(Microphone Array)

Figure 2:
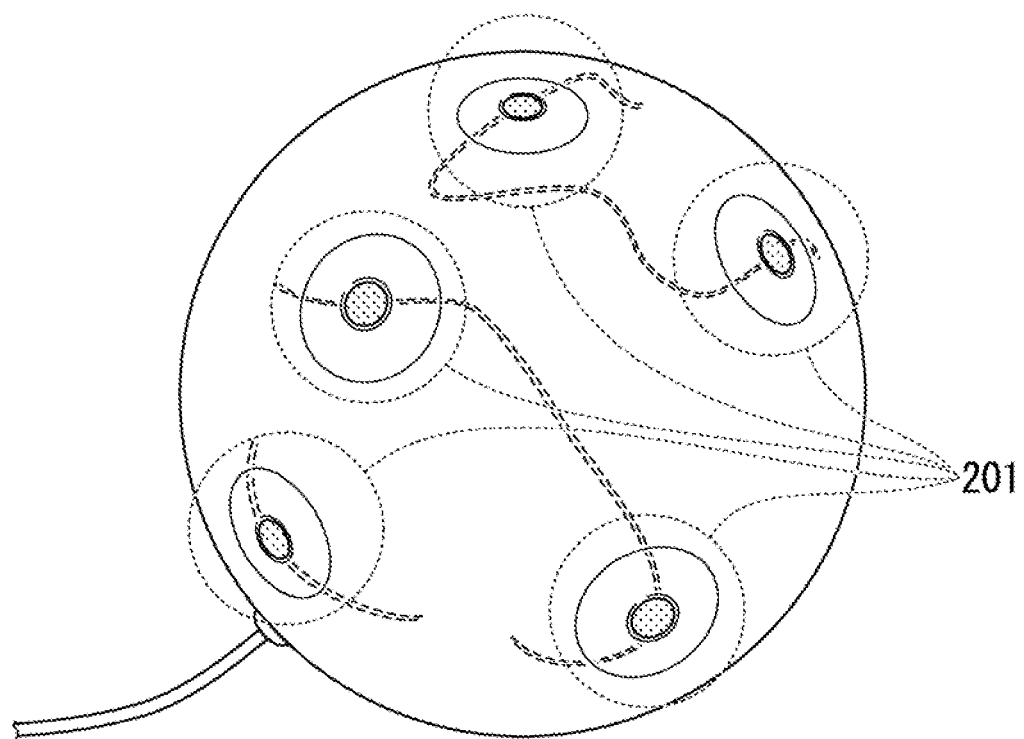
FIG. 2 is a diagram illustrating an example of the external shape of a microphone array (a sound receiving unit 20).

FIG. 2 is a diagram illustrating an example of the external shape of a microphone array (a sound receiving unit 20).

The microphone array illustrated in FIG. 2, for example, has a sphere shape as its external shape and includes 16 microphones 201 on a side face of the spherical body. In addition, the microphones 201 are disposed also in a vertical direction in addition to a conventional horizontal direction used for estimation of a sound source direction for a direction in two dimensions.

(Audio Processing Device)

Next, an example of the configuration of the audio processing device 1 will be described.

As illustrated in FIG. 1, the audio processing device 1 includes an input unit 10, an initial processing unit 12, a sound source position estimating unit 14, a sound source identifying unit 16, an output unit 18, and a storage unit 19.

The initial processing unit 12 includes a sound source localizing unit 120, a sound source separating unit 122, and a frequency analyzing unit 124.

The sound source position estimating unit 14 includes an initial value setting unit 130 and a sound source position updating unit 142.

The sound source identifying unit 16 includes a dispersion calculating unit 160, a score calculating unit 162, and a sound source selecting unit 164.

The input unit 10 outputs audio signals of Q channels input from each microphone array m to the initial processing unit 12. The input unit 10, for example, is configured to include an input/output interface.

The sound source localizing unit 120 performs sound source localization on the basis of audio signals of Q channels that are input from the input unit 10 and are acquired from each microphone array mk and estimates a direction of each sound source for every frame of a length set in advance (for example, 100 ms). The sound source localizing unit 120, for example, calculates a spatial spectrum representing a power level for each direction using a multiple signal classification (MUSIC) method in sound source localization.

The sound source localizing unit 120 determines a sound source direction for each sound source on the basis of the spatial spectrum. The sound source localizing unit 120 outputs sound source direction information representing a sound source direction of each sound source set for each microphone array m and audio signals of Q channels acquired by the microphone array m to the sound source separating unit 122 in association with each other. The MUSIC method will be described later.

Sound source direction information and audio signals of Q channels for each microphone array m are input from the sound source localizing unit 120 to the sound source separating unit 122. The sound source separating unit 122 separates audio signals of Q channels into audio signals of individual sound sources representing components for respective sound sources on the basis of localized sound source directions represented by the sound source direction information for each microphone array m. When signals are separated into audio signals of individual sound sources, for example, the sound source separating unit 122 uses a geometric-constrained high-order decorrelation-based source separation (GHDSS) method. The sound source separating unit 122 outputs a separated audio signal of an individual sound source for each sound source and sound source direction information representing a localized sound source direction of the sound source to the frequency analyzing unit 124 and the sound source position estimating unit 14 in association with each other for each microphone array m. The GHDSS method will be described later.

An audio signal of an individual sound source and sound source direction information for each sound source are input to the frequency analyzing unit 124 in association with each other for each microphone array m. The frequency analyzing unit 124 performs a frequency analysis of an audio signal of an individual sound source for each sound source that is separated from audio signals relating to an individual microphone array m for every frame having a predetermined time length (for example, 128 points), thereby calculating spectrums $[F_{m,\,1}]$ and $[F_{m,\,2}]$ to $[F_{m,\,sm}]$. [ . . . ] represents a set formed by a plurality of values of a vector, a matrix, or the like. sm represents the number of sound sources estimated through sound source localization and sound source separation from audio signals acquired by a microphone array m. Here, each of the spectrums $[F_{m,\,1}]$ and $[F_{m,\,2}]$ to $[F_{m,\,sm}]$ is a row vector. In the frequency analysis, the frequency analyzing unit 124, for example, performs a short-time Fourier transform (STFT) for a signal acquired by applying a Hamming window of 128 points to an audio signal of each individual sound source. The frequency analyzing unit 124 sequentially shifts frames forming a section that is an analysis target by superimposing frames adjacent to each other in time.

The frequency analyzing unit 124 configures a spectrum matrix $[F_m]$ for each microphone array m (here, m is an integer from 1 to M) represented in the following Equation (1) by integrating spectrums for sound sources between rows. The frequency analyzing unit 124 configures a spectrum matrix [F] represented in the following Equation (2) by further integrating the configured spectrum matrixes $[F_1]$ and $[F_2]$ to $[F_M]$ between rows. The frequency analyzing unit 124 outputs the configured spectrum matrix [F] and sound source direction information representing a localized sound source direction of each sound source to the sound source identifying unit 16 in association with each other.

$$[F_m]=[[F_{m,1}],[F_{m,2}],\ldots,[F_{m,s_m}]]^T \qquad (1)$$

$$[F]=[[F_1],[F_2],\ldots,[F_M]]^T \qquad (2)$$

The initial value setting unit 140 sets an initial value of an estimated sound source position that is a position estimated as a candidate for a sound source using a triangle division method (triangulation) on the basis of sound source direction information for each microphone array m input from the sound source separating unit 122. The triangle division method is a technique for setting the center of gravity of three midpoints relating to candidates for a sound source that are determined from a set of three microphone arrays among M microphone arrays as an initial value of the estimated sound source position of the sound source. In the following description, a candidate for a sound source will be referred to as a sound source candidate. A midpoint is a midpoint (including an intersection between half lines) of a segment that is perpendicular to both of half lines directed toward localized sound source directions estimated on the basis of audio signals acquired by microphone arrays m through the positions of the microphone arrays m for each set of two microphone arrays m among three microphone arrays m. The initial value setting unit 140 outputs initial estimated sound source position information representing an initial value of an estimated sound source position for each sound source candidate to the sound source position updating unit 142. An example of the initial value setting process will be described later.

For each set of two microphone arrays m, the sound source position updating unit 142 determines a midpoint of a segment perpendicular to both of half lines directed in estimated sound source directions of sound source candidates relating to localized sound source directions based on the microphone arrays m from the microphone arrays m.

Here, an estimated sound source direction represents a direction toward an estimated sound source position. The sound source position updating unit 142 performs clustering of a spatial distribution of determined midpoints, thereby classifying the spatial distribution into a plurality of clusters (groups). The sound source position updating unit 142 updates an estimated sound source position such that an estimation probability, which is a probability of an estimated sound source position for each sound source candidate being classified into a cluster corresponding to each sound source candidate, increases.

The sound source position updating unit 142 uses an initial value of an estimated sound source position represented by the initial estimated sound source position information input from the initial value setting unit 140 as an initial value of the estimated sound source position for each sound source candidate. When the amount of update of the estimated sound source position or the estimated sound source direction becomes smaller than a threshold for a predetermined amount of update, the sound source position updating unit 142 determines that a change in the estimated sound source position or the estimated sound source direction has converged and stops the update of the estimated sound source position. The sound source position updating unit 142 outputs estimated sound source position information representing the estimated sound source position for each sound source candidate to the sound source identifying unit 16. When the amount of update is equal to or larger than the threshold for the predetermined amount of update, the sound source position updating unit 142 continues the process of updating the estimated sound source position for each sound source candidate. An example of the process of updating an estimated sound source position will be described later.

The sound source identifying unit 16 is configured to include the dispersion calculating unit 160, the score calculating unit 162, and the sound source selecting unit 164.

A spectrum matrix [F] and sound source direction information are input from the frequency analyzing unit 124 to the dispersion calculating unit 160, and estimated sound source position information is input from the sound source position estimating unit 14 to the dispersion calculating unit 160.

The dispersion calculating unit 160 repeats a process to be described next a predetermined number of times. The number of times of repetition R is set in the dispersion calculating unit 160 in advance.

The dispersion calculating unit 160 performs clustering for spectrums of sound sources for each sound receiving unit 20 represented by the spectrum matrix [F] and classifies the spectrums into a plurality of clusters (groups). The clustering executed by the dispersion calculating unit 160 is independent from clustering executed by the sound source position updating unit 142. The dispersion calculating unit 160, for example, uses k-means clustering as a technique for clustering. In the k-means clustering, a plurality of pieces of data that are targets for clustering are randomly assigned to k clusters. The dispersion calculating unit 160 changes a cluster to be assigned as an initial value for each spectrum in each number of times of repetition r. In the following description, clusters classified by the dispersion calculating unit 160 will be referred to as second clusters. The dispersion calculating unit 160 calculates an index value representing a degree of similarity among a plurality of spectrums belonging to each second cluster. The dispersion calculating unit 160 determines whether or not sound source candidates relating to spectrums are the same depending on whether or not the calculated index value is higher than an index value representing a predetermined degree of similarity.

For sound source candidates corresponding to second clusters of which sound source candidates are determined to be the same, the dispersion calculating unit 160 calculates a dispersion of an estimated sound source position of the sound source candidate represented by the estimated sound source position information thereof. As will be described later, in this stage, the reason for this is that there is a possibility that the number of sound source candidates of which sound source positions are updated by the sound source position updating unit 142 will be larger than the number of second clusters. For example, the dispersion calculating unit 160 may set the score to zero when a dispersion calculated for the second cluster at the current number of times of repetition r is larger than a dispersion calculated at the previous number of times of repetition r−1. The dispersion calculating unit 160 sets a score to c when a dispersion calculated at the current number of times of repetition r is equal to or smaller than a dispersion calculated at the previous number of times of repetition r−1 for the second cluster. Here, for example, E is predetermined positive real number. As the frequency of an increase in dispersion becomes higher, an estimated sound source position classified into a second cluster becomes more different in accordance with the number of times of repetition, in other words, the stability of the second cluster is lowered. In other words, the set score represents a stability of the second cluster. When a second cluster has a higher score, the sound source selecting unit 164 selects an estimated sound source position of a sound source candidate corresponding thereto with priority.

For a second cluster of which sound source candidates are determined not to be the same, the dispersion calculating unit 160 determines that there is no sound source candidate corresponding thereto, determines that the dispersion of the estimated sound source positions is not valid and sets the score to 6. Here, for example, 6 is a negative real number smaller than zero. In this way, the sound source selecting unit 164 selects an estimated sound source position relating to sound source candidates of which the sound source candidates are determined to be the same with priority over sound source candidates determined not to be the same.

The dispersion calculating unit 160 outputs a score of each number of times of repetition for each second cluster and score calculation information representing an estimated sound source position to the score calculating unit 162.

The score calculating unit 162 calculates a final score of each sound source candidate corresponding to the second cluster on the basis of the score calculation information input from the dispersion calculating unit 160. Here, the score calculating unit 162 measures a validness that is the number of times a valid dispersion is determined for each second cluster and calculates a total value of scores for respective times. The total value of scores becomes larger as the number of times of validness that is the number of times at which a dispersion increases at respective times increases. In other words, as the stability of the second cluster becomes higher, a total value of scores becomes larger. In addition, at this stage, there are cases in which one estimated sound source position may extend over a plurality of second clusters. Thus, the score calculating unit 162 calculates a final score of a sound source candidate corresponding to an estimated sound source position by dividing a total sum of total values of scores of estimated sound source positions by a total sum of numbers of times of validness that has been counted. The score calculating unit 162 outputs the calculated final score of the sound source candidate and final score information representing an estimated source sound position to the sound source selecting unit 164.

The sound source selecting unit 164 selects a sound source candidate for which a final score of the sound source candidate represented by final score information input from the score calculating unit 162 is equal to or higher than a predetermined threshold $\theta_2$ of the final score as a sound source. The sound source selecting unit 164 rejects sound source candidates of which final scores are lower than the threshold $\theta_2$. The sound source selecting unit 164 outputs output sound source position information representing an estimated sound source position for each sound source for the selected sound source to the output unit 18.

The output unit 18 outputs the output sound source position information input from the sound source selecting unit 164 outside of the audio processing device 1. The output unit 18, for example, is configured to include an input/output interface.

The output unit 18 and the input unit 10 may be configured by common hardware. The output unit 18 may include a display unit (for example, a display) displaying output sound source position information. The audio processing device 1 may be configured to include a storage medium that stores output sound source position information together with the output unit 18 or instead of the output unit 18.

The storage unit 19 stores a transfer function for respective directions y distributed at a predetermined interval (for example, 5°) in advance. The storage unit 19 may store an audio signal received by each microphone array. The storage unit 19, as will be described later, stores audio signals of a predetermined period and derived data.

(MUSIC Method)

Here, a MUSIC method that is one method of sound source localization will be described.

The MUSIC method is a technique for determining a direction $\psi$ in which a power $P_{ext}(\psi)$ of a spatial spectrum to be described below is a maximum and is higher than a predetermined level as a localized sound source direction. A transfer function for respective directions $\psi$ distributed at a predetermined interval (for example, 5°) is stored in the storage unit 19 included in the sound source localizing unit 120 in advance. In this embodiment, a process to be described next is executed for each microphone array m.

The sound source localizing unit 120 generates a transfer function vector $[D(\psi)]$ having transfer functions $D[_q](\omega)$ from a sound source to a microphone corresponding to each channel q (here, q is an integer equal to or larger than "1" and is equal to or smaller than Q) as its element for each direction $\psi$.

The sound source localizing unit 120 calculates a transformation coefficient $\xi_q(\omega)$ by transforming an audio signal $\xi_q$ of each channel q for each frame configured by a predetermined number of elements into a frequency domain. The sound source localizing unit 120 calculates an input correlation matrix $[R_{\xi\xi}]$ represented in the following equation (3) from an input vector $[\xi(\omega)]$ including the calculated transformation coefficient as its element.

$$[R_{\xi\xi}]=E[[\xi(\omega)][\xi(\omega)]^*] \quad (3)$$

In Equation (3), E[ ... ] represents an expected value of " ... ". [ ... ] indicates that " ... " is a matrix or a vector. In addition, [ ... ]* represents a conjugate transpose of a matrix or a vector.

The sound source localizing unit 120 calculates an eigenvalue $\delta_p$ and an eigenvector $[\varepsilon_p]$ of the input correlation matrix $[R_{\xi\xi}]$. The input correlation matrix $[R_{\xi\xi}]$, the eigenvalue $\delta_p$, and the eigenvector $[\varepsilon_p]$ have a relationship represented in the following Equation (4).

$$[R_{\xi\xi}][\varepsilon_p]=\delta_p[\varepsilon_p] \quad (4)$$

In Equation (4), p is an integer equal to or larger than "1" and equal to or smaller than Q. The order of the index p is the descending order of the eigenvalue $\delta_p$.

The sound source localizing unit 120 calculates power $P_{sp}(\psi)$ of the spatial spectrum for each frequency represented in the following Equation (5) on the basis of the transfer function vector $[D(\psi)]$ and the calculated eigenvector $[\varepsilon_p]$.

$$P_{sp}(\varphi) = \frac{|[D(\varphi)]^*[D(\varphi)]|}{\sum_{p=D_m+1}^{Q} |[D(\varphi)]^*[\varepsilon_p]|} \quad (5)$$

In Equation (5), $D_m$ is a maximum number (for example, two) of sound sources that can be detected and is a natural number, which is smaller than Q, set in advance.

The sound source localizing unit 120 calculates a total sum of the spatial spectrum $P_{sp}(\psi)$ in a frequency band in which an S/N ratio is higher than a threshold (for example, 20 dB) set in advance as power $P_{ext}(\psi)$ of the spatial spectrum of the entire band.

In addition, the sound source localizing unit 120 may calculate a localized sound source direction using any other technique instead of the MUSIC method. For example, a weighted delay and sum beam forming (WDS-BF) method can be used. The WDS-BF method, as represented in the following Equation (6), is a technique of calculating a square value of a delay sum of audio signals $\xi_q(t)$ of the entire band of each channel q as power $P_{ext}(\psi)$ of the spatial spectrum and searching for a localized sound source direction $\psi$ in which the power $P_{ext}(\psi)$ of the spatial spectrum becomes a maximum.

$$P_{exp}(\varphi)=[D(\varphi)]^*E[[\xi(t)][\xi(t)]^*][D(\varphi)] \quad (6)$$

In Equation (6), a transfer function represented by each element of $[D(\psi)]$ represents a contribution according to a phase delay from a sound source to a microphone corresponding to each channel q (here, q is an integer equal to or larger than "1" and equal to or smaller than Q).

$[\xi(t)]$ is a vector having a signal value of an audio signal $\xi_q(t)$ of each channel q at a time point of a time t as its element.

(GHDSS Method)

Next, a GHDSS method that is one method of sound source separation will be described.

The GHDSS method is a method of adaptively calculating a separation matrix $[V(\omega)]$ such that separation sharpness $J_{SS}([V(\omega)])$ and geometric constraint $J_{GC}([V(\omega)])$ as two cost functions decrease. In this embodiment, audio signals of individual sound sources are separated from audio signals acquired by each microphone array m.

The separation matrix $[V(\omega)]$ is a matrix used for calculating audio signals of individual sound sources (an estimated value vector) $[u'(\omega)]$ for each of a maximum of detected $D_m$ sound sources by multiplying audio signals $[\xi(\omega)]$ of Q channels input from the sound source localizing unit 120. Here, $[ ... ]^T$ represents transposition of a matrix or a vector.

The separation sharpness $J_{SS}([V(\omega)])$ and the geometric constraint $J_{GC}([V(\omega)])$ are respectively represented as the following Equations (7) and (8).

$$J_{ss}([V(\omega)])=\|\phi([u'[\omega]])[u'(\omega)]^*-\text{diag}[\phi([u'(\omega)])][u'(\omega)]^*]\|^2 \qquad (7)$$

$$J_{GC}([V(\omega)])=\|\text{diag}[[V(\omega)][D(\omega)]-[I]]\|^2 \qquad (8)$$

In Equations (7) and (8), $\|\ldots\|^2$ is a Frobenius norm of a matrix. The Frobenius norm is a sum of squares of elements configuring a matrix (scalar value). $\varphi([u'(\omega)])$ is a nonlinear function of an audio signal $[u'(\omega)]$ of an individual sound source and, for example, is a hyperbolic tangent function. diag[ . . . ] represents a total sum of diagonal components of a matrix . . . . Thus, the separation sharpness $J_{SS}([V(\omega)])$ is an index value representing the magnitude of an inter-channel non-diagonal component of a spectrum of an audio signal (estimated value) of an individual sound source, in other words, a degree of erroneous separation of one certain sound source as a different sound source. In addition, in Equation (8), [I] represents a unit matrix. Thus, the geometric constraint $J_{GC}([V(\omega)])$ is an index value that represents a degree of error between a spectrum of an audio signal (estimated value) of an individual sound source and a spectrum of an audio signal (sound source) of an individual sound source.

(Midpoint (Included Intersection) According to Microphone Array)

Next, a midpoint (included intersection) according to a microphone array will be described.

First, an intersection according to a microphone array in a two-dimensional space will be described.

Figure 3:
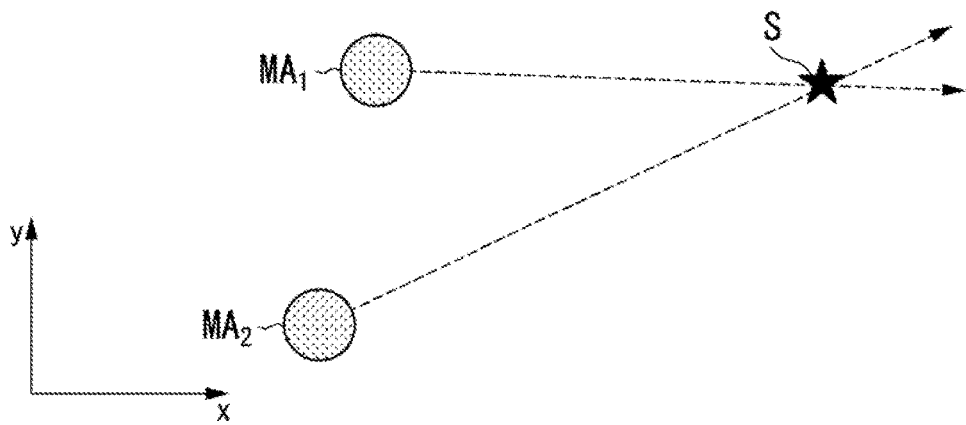
FIG. 3 is a diagram illustrating sound source directions localized by two microphone arrays in a two-dimensional space.

FIG. 3 is a diagram illustrating sound source directions localized by two microphone arrays in a two-dimensional space. In FIG. 3 the horizontal direction will be set as an x-axis direction, and the vertical direction will be set as a y-axis direction. In addition, for example, an xy plane is a plane that is horizontal to the ground.

In this example, half lines toward localized sound source directions estimated on the basis of audio signals acquired by microphone arrays that pass through positions of the microphone arrays MA1 and MA2 are determined. Such two half lines intersect each other at one point that is a position of a sound source S.

Next, a midpoint (included intersection) according to microphone arrays in a three-dimensional plane will be described.

Figure 4:
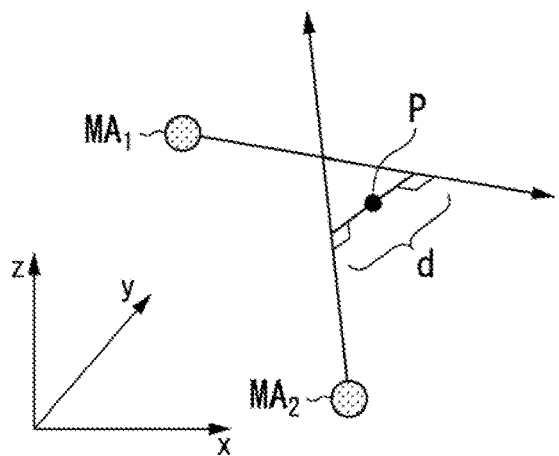
FIG. 4 is a diagram illustrating sound source directions localized by two microphone arrays in a three-dimensional space.

FIG. 4 is a diagram illustrating sound source directions localized by two microphone arrays in a three-dimensional space. In FIG. 4, the horizontal direction will be set as an x-axis direction, the vertical direction will be set as an y-axis direction, and the height direction will be set as a z-axis direction. In addition, for example, an xy plane is a horizontal plane that is horizontal to the ground.

In this embodiment, as described above, since a sound reception target is a birdcall of a wild bird, and a sound reception place is a field, the effect of an echo sound is smaller than that of indoor sound reception. For this reason, in this embodiment, an estimated sound source position is acquired as a point on two azimuth lines closest to each other.

In this example, half lines toward localized sound source directions estimated on the basis of audio signals acquired by microphone arrays that pass through positions of the microphone arrays $MA_1$ and $MA_2$ are determined. There are cases in which such two half lines are parallel to each other without intersecting with each other at one point in a three-dimensional space. However, in a case in which an analysis is performed using audio signals received in an actual environment, it can be assumed that all the directions representing a single sound source at a certain time are distorted lines.

For this reason, in this embodiment, as an estimated sound source position, a midpoint P of a shortest distance d is regarded as an intersection.

Two points P and Q on two azimuth lines of microphone arrays $MA_1$ and $MA_2$ are represented as in the following Equations (9) and (10).

$$P=m_j+r_j a_j \qquad (9)$$

$$Q=m_k+r_k a_k \qquad (10)$$

In Equations (9) and (10), $m_j$ and $m_k$ are (x, y, z) coordinates of two microphone arrays, $a_j$ and $a_k$ are direction cosines (unit vectors) of two direction lines, and $r_j$ and $r_k$ are distances from a corresponding microphone to the points P and Q.

By using Equations (9) and (10), a vector of the point P and the point Q can be represented as in the following Equation (11).

$$\vec{PQ}=Q-P=m_k-m_j+r_k a_k-r_j a_j \qquad (11)$$

Here, a line having a shortest distance between two lines respectively passing through the point P and the point Q is a line that is perpendicular to both the lines.

Since values of $m_j$, $m_k$, $a_j$, are $a_k$ are known, distances $r_j$ and $r_k$ can be acquired by calculating an inner product of direction vectors of both the lines using the PQ vector as represented in the following Equation (12).

$$\begin{cases} \vec{PQ}\cdot a_j = 0 \\ \vec{PQ}\cdot a_k = 0 \end{cases} \qquad (12)$$

In order to estimate a sound source position, the calculation described above is performed for a pair of direction lines acquired from the microphone arrays.

An estimated sound source position is the center of gravity of a midpoint of a perpendicular line having a shortest distance between two lines respectively passing through the point P and the point Q of a pair of a plurality of microphone arrays. For this reason, a midpoint of P and Q of each pair and the center of gravity of the midpoint are calculated using the following Equation (13).

$$\tilde{x} = \frac{\sum_{i=1}^{3} P_i + Q_i}{2 \cdot 3} \qquad (13)$$

Figure 5:
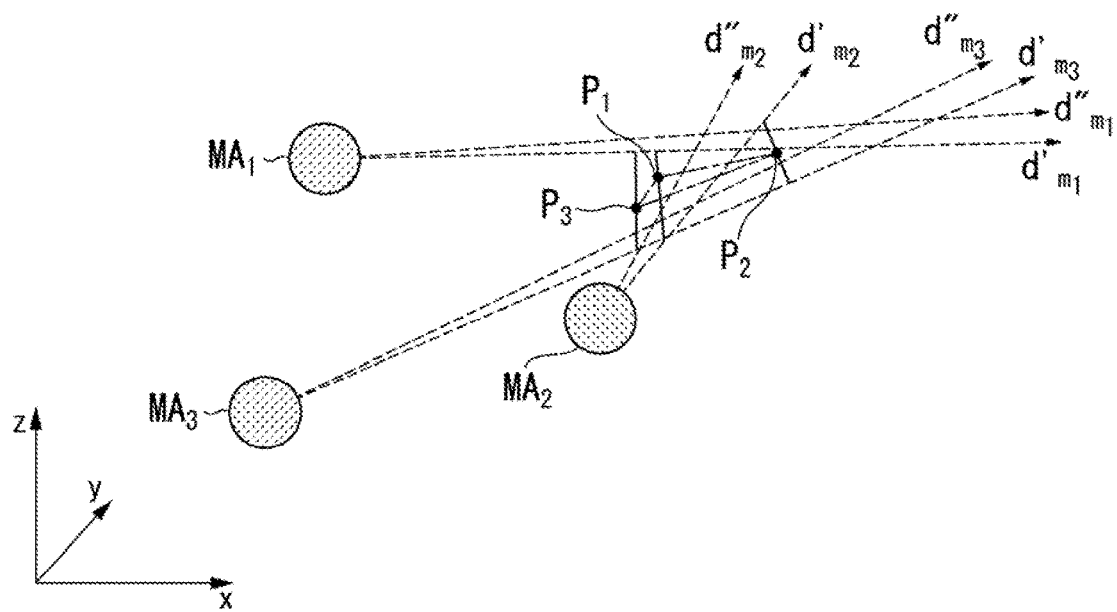
FIG. 5 is a diagram illustrating an example of estimation of a sound source position from three microphone arrays according to this embodiment.

Equation (13) is executed for data acquired from three microphone arrays at one time as illustrated in FIG. 5. FIG. 5 is a diagram illustrating an example of estimation of a sound source position from three microphone arrays according to this embodiment. A coordinate system of FIG. 5 is the same as that of FIG. 4. A center point of a line that is perpendicular to both lines according to microphone arrays $MA_1$ and $MA_2$ is C1. A center point of a line that is perpendicular to both lines according to microphone arrays $MA_2$ and $MA_3$ is $C_2$. A center point of a line that is perpendicular to both lines according to the microphone arrays $MA_1$ and $MA_3$ is C3. In addition, localized sound source directions $d'_{m1}$ and $d''_{m1}$ are results of localization using the microphone array $MA_1$. Localized sound source directions $d'_{m2}$ and $d''_{m2}$ are results of localization using the microphone array $MA_2$. Localized sound source directions $d'_{m3}$ and $d''_{m3}$ are results of localization using the microphone array $MA_3$.

Also in a case in which three or more microphone arrays are used, by executing Equation (13) for all the combinations of the three microphone arrays and, for example, acquiring the center of gravity thereof, an estimated sound source position x is acquired.

(Setting of Initial Value)

Figure 6:
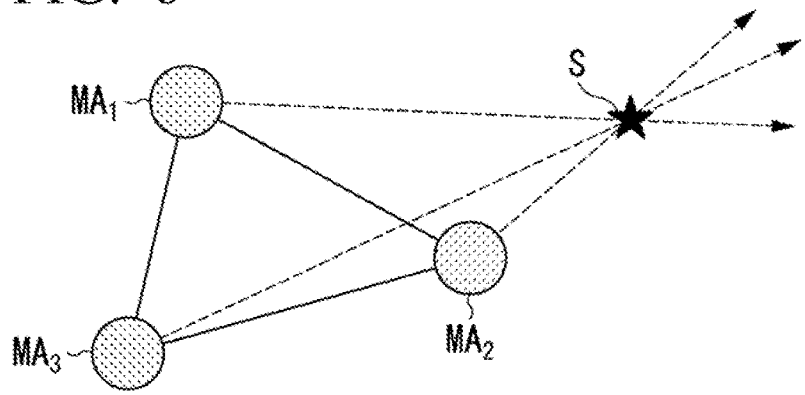
FIG. 6 is a diagram illustrating one example of arrangement of microphone arrays and estimated sound source directions.

Next, an example of setting of an initial value that is performed by the initial value setting unit 140 (FIG. 1) will be described. Ideally, a midpoint (included intersection) determined on the basis of two microphone arrays m is the same as a sound source position of each sound source. A case in which a localized sound source direction of a sound source S is estimated on the basis of audios signals acquired by microphone arrays $MA_1$, $MA_2$, and $MA_3$ disposed at mutually-different positions will be described as an example with reference to FIG. 6. FIG. 6 is a diagram illustrating one example of arrangement of microphone arrays and estimated sound source directions. In this example, half lines toward localized sound source directions estimated on the basis of audio signals acquired by microphone arrays that pass through positions of the microphone arrays $MA_1$, $MA_2$, and $MA_3$ are determined. Ideally, such three half lines intersect each other at one point that is a position of a sound source S.

Figure 7:
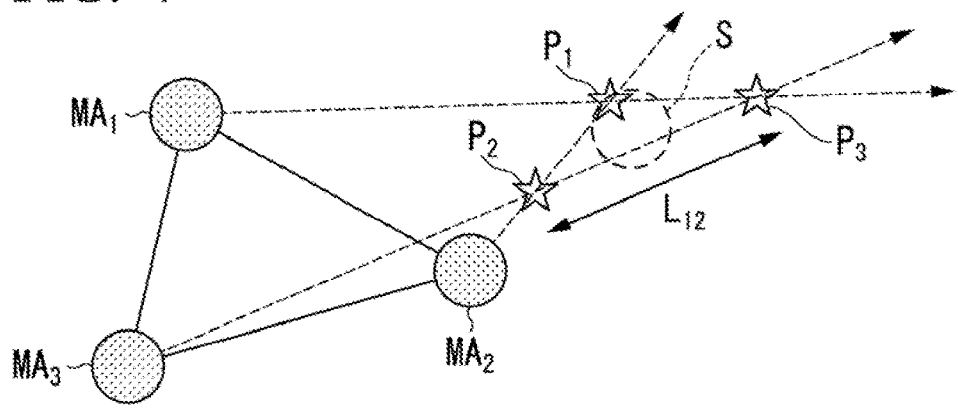
FIG. 7 is a diagram illustrating an example of midpoints (included intersections) based on a set of sound source directions estimated from microphone arrays.

However, error is included in the localized sound source directions of the sound source S. Practically, as illustrated in FIG. 7, positions of midpoints (included intersections) $P_1$, $P_2$, and $P_3$ relating to one sound source are different from each other. FIG. 7 is a diagram illustrating an example of midpoints based on a set of sound source directions estimated from microphone arrays. A midpoint $P_1$ is a midpoint of a segment perpendicular to both of half lines in localized sound source directions of a sound source S estimated from audio signals acquired by microphone arrays $MA_1$ and $MA_2$ that pass through positions of the microphone arrays $MA_1$ and $MA_2$. A midpoint $P_2$ is a midpoint of a segment perpendicular to both of half lines in localized sound source directions of a sound source S estimated from audio signals acquired by microphone arrays $MA_2$ and $MA_3$ that pass through positions of the microphone arrays $MA_2$ and $MA_3$. A midpoint $P_3$ is a midpoint of a segment perpendicular to both of half lines in localized sound source directions of a sound source S estimated from audio signals acquired by microphone arrays $MA_1$ and $MA_3$ that pass through positions of the microphone arrays $MA_1$ and $MA_3$. For the same sound source S, in a case in which error in a localized sound source direction estimated from audio signals acquired by each microphone array is random, a real sound source position is expected to be present in an inner area of a triangle having the midpoints $P_1$, $P_2$, and $P_3$ as its apexes. Thus, the initial value setting unit 140 sets the center of gravity among the midpoints $P_1$, $P_2$, and $P_3$ as an initial value $x_n$ of the estimated sound source position of a sound source candidate that is a candidate for the sound source S.

However, there are cases in which the number of sound source directions estimated from audio signals acquired from each microphone array m by the sound source localizing unit 120 is not limited to one and may be two or more. For this reason, it cannot be determined that the midpoints $P_1$, $P_2$, and $P_3$ are determined on the basis of directions of the same sound source S. Thus, the initial value setting unit 140 determines whether or not all the distances $L_{12}$, $L_{23}$, and $L_{13}$ between two midpoints among the three midpoints $P_1$, $P_2$, and $P_3$ are shorter than a threshold $\theta_1$ of the distance set in advance and whether or not at least one of the distances between the midpoints is equal to or longer than the threshold $\theta_1$. When it is determined that all the distances are shorter than the threshold $\theta_1$, the initial value setting unit 140 employs the center of gravity of the midpoints $P_1$, $P_2$, and $P_3$ as an initial value $x_n$ of the sound source position of a sound source candidate n. In a case in which at least one of the distances between the midpoints is equal to or longer than the threshold $\theta_1$, the initial value setting unit 140 rejects the center of gravity of the midpoints $P_1$, $P_2$, and $P_3$ without determining it as the initial value $x_n$ of the sound source position.

Here, positions $u_{MA1}$, $U_{MA2}$, ..., $u_{MAM}$ of M microphone arrays $MA_1$, $MA_2$, ..., $MA_M$ are set in the sound source position estimating unit 14 in advance. A position vector [u] having the positions $u_{MA1}$, $u_{MA2}$, ..., $u_{MAM}$ of the individual microphones m as its elements can be represented in the following Equation (14).

$$[u]=[u_{MA_1},u_{MA_2},\ldots,u_{MA_M}]^T \qquad (14)$$

In Equation (14), a position uMAm (here, m is an integer from "1" to M) of a microphone array m is two-dimensional coordinates $[u_{MAxm}, u_{MAym}]$ having an x-coordinate $u_{MAxm}$ and a y-coordinate $u_{MAym}$ as its element values.

As described above, the sound source localizing unit 120 determines a maximum of $D_m$ localized sound source directions $d'_m(1)$, $d'm(2)$, ..., $d'_m(D_m)$ from audio signals of Q channels acquired by each microphone array MAm for each frame. A vector [d'] having the localized sound source directions $d'_m(1)$, $d'm(2)$, ..., $d'_m(D_m)$ as its elements can be represented in the following Equation (15).

$$[d'_m]=[d'_m(1),d'_m(2),\ldots,d'_m(D_m)]^T \qquad (15)$$

Next, one example of an initial setting process of the estimation of a sound source position according to this embodiment will be described.

Figure 8:
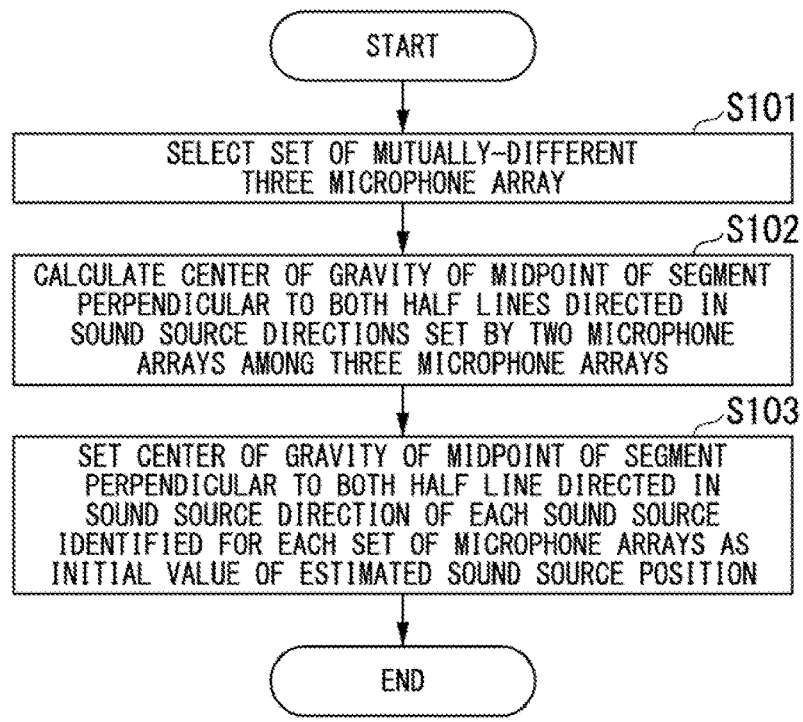
FIG. 8 is a flowchart illustrating one example of an initial setting process of estimation of a sound source position according to this embodiment.

FIG. 8 is a flowchart illustrating one example of an initial setting process of the estimation of a sound source position according to this embodiment.

(Step S101) The initial value setting unit 140 selects a set (triplet) of mutually-different three microphone arrays $m_1$, $m_2$, and $m_3$ from M microphone arrays in a triangle division method. After the process, the process proceeds to Step S102.

(Step S102) The initial value setting unit 140, for the selected set of three microphone arrays $m_1$, $m_2$, and $m_3$, selects localized sound source directions $d'_{m1}(\delta_1)$, $d'_{m2}(\delta_2)$, $d'_{m3}(\delta_3)$ of respective sound sources $\delta_1$, $\delta_2$, and $\delta_3$ from a maximum of $D_m$ sound sources estimated on the basis of audio signals acquired by each of the microphone arrays. Continuously, the initial value setting unit 140, for a set (pair) of every two microphone arrays among the three microphone arrays, calculates the center of gravity of midpoints $P_1$, $P_2$, and $P_3$ using Equation (13).

Here, a center point of a line perpendicular to both lines according to the microphone arrays $m_1$ and $m_2$ is $P_1$, a center point of a line perpendicular to both lines according to the microphone arrays $m_2$ and $m_3$ is $P_2$, and a center point of a line perpendicular to both lines according to the microphone arrays $m_1$ and $m_3$ is $P_3$. As represented in the following Equation (16), the midpoint $P_1$ is determined using the positions of the microphone arrays $m_1$ and $m_2$ and the localized sound source directions $d'_{m1}(\delta_1)$ and $d'_{m2}(\delta_2)$. The midpoint $P_2$ is determined using the positions of the microphone arrays $m_2$ and $m_3$ and the localized sound source directions $d'_{m2}(\delta_2)$ and $d'_{m3}(\delta_3)$. The midpoint $P_3$ is determined using the positions of the microphone arrays $m_1$ and $m_3$ and the localized sound source directions $d'_{m1}(\delta_1)$ and $d'_{m3}(\delta_3)$. In addition, an intersection between half lines toward the localized sound source directions according to two microphones is also included in the midpoints. Thereafter, the process proceeds to the process of Step S103.

$$P_1 = p(m_1(\delta_1), m_2(\delta_2))$$

$$P_2 = p(m_2(\delta_2), m_3(\delta_3))$$

$$P_3 = p(m_1(\delta_1), m_3(\delta_3)) \qquad (16)$$

(Step S103) The initial value setting unit 140 determines the center of gravity of the center points of sound sources identified for each set of microphone arrays as an initial value of the estimated sound source position.

In a case in which all the calculated distances $L_{12}$, $L_{23}$, and $L_{13}$ are equal to or shorter than the threshold $\theta_1$, the initial value setting unit 140 selects a combination of the three midpoints $P_1$, $P_2$, and $P_3$ as a combination relating to the sound source candidate n. In such a case, the initial value setting unit 140, as represented in the following Equation (17), sets the center of gravity of the midpoints $P_1$, $P_2$, and $P_3$ as an initial value $x_n$ of the sound source estimated position of the sound source candidate n.

On the other hand, in a case in which at least one of the distances $L_{12}$, $L_{23}$, and $L_{13}$ is longer than the threshold $\theta_1$, the initial value setting unit 140 rejects such a combination of the midpoints and does not set the initial value $x_n$. In Equation (17), $\varphi$ represents a null set. Thereafter, the process illustrated in FIG. 6 ends.

$$x_n = \begin{cases} \frac{1}{3} \sum_{i=1}^{3} P_i, & (L_{12}, L_{23}, L_{31} \leq \theta_1) \\ \phi & \text{(Other cases)} \end{cases} \qquad (17)$$

The initial value setting unit 140 executes the processes of Steps S101 to S103 for each combination of the localized sound source directions $d'_{m1}(\delta_1)$, $d'_{m2}(\delta_2)$, $d'_{m3}(\delta_3)$ respectively estimated for the microphone arrays $m_1$, $m_2$, and $m_3$. In this way, a combination of midpoints that is inappropriate as a sound source candidate is rejected, and an initial value $x_n$ of the sound source estimated position is set for each sound source candidate n.

In the following description, the number of sound source candidates will be denoted by N.

In addition, the initial value setting unit 140 may execute the processes of Steps S101 to S103 for each set of three microphone arrays among M microphone arrays. In such a case, a detection miss of a candidate n for the sound source can be reduced.

Figure 9:
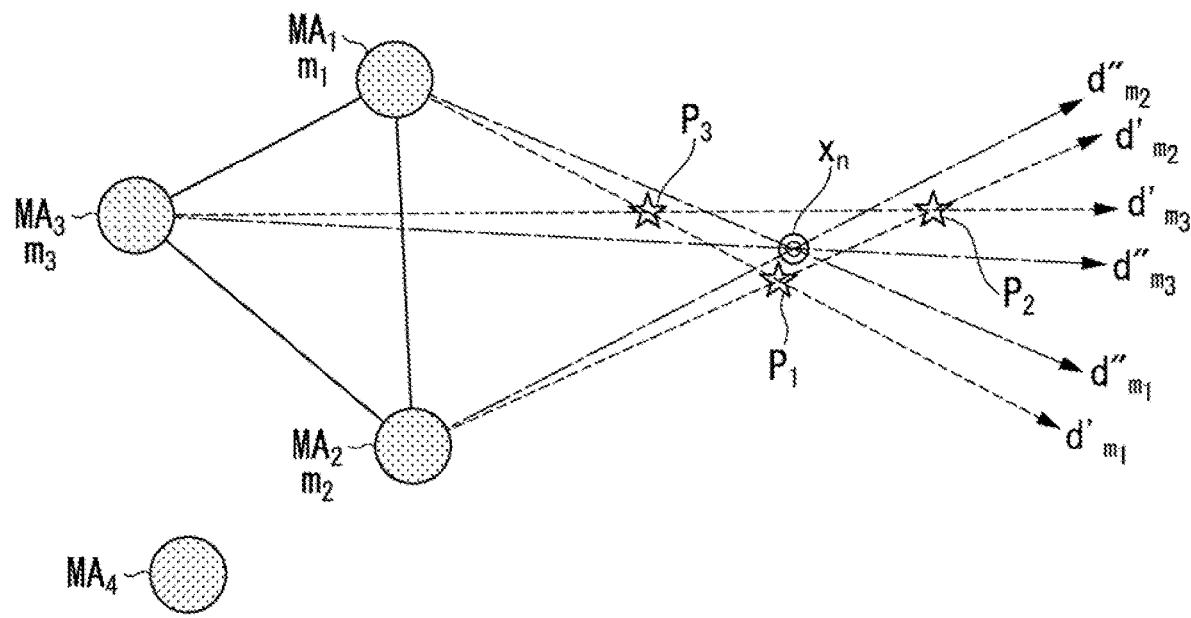
FIG. 9 is a diagram illustrating a case in which three microphone arrays $MA_1$ to $MA_3$ are selected as microphone arrays $m_1$ to $m_3$ among four microphone arrays $MA_1$ to $MA_4$, and an initial value $x_n$ of the estimated sound source position is determined from a combination of estimated localized sound source directions $d'_{m1}$, $d'_{m2}$, and $d'_{m3}$.

FIG. 9 is a diagram illustrating a case in which three microphone arrays $MA_1$ to $MA_3$ are selected as microphone arrays $m_1$ to $m_3$ among four microphone arrays $MA_1$ to $MA_4$, and an initial value $x_n$ of the estimated sound source position is determined from a combination of estimated localized sound source directions $d'_{m1}$, $d'_{m2}$, and $d'_{m3}$.

A direction of a midpoint $P_1$ is the same as localized sound source directions $d'_{m1}$ and $d'_{m2}$ respectively with reference to the positions of the microphone arrays $m_1$ and $m_2$. A direction of a midpoint $P_2$ is the same as sound source directions $d'_{m2}$ and $d'_{m3}$ respectively with reference to the positions of the microphone arrays $m_2$ and $m_3$. A direction of a midpoint $P_3$ is the same as localized sound source directions $d'_{m1}$ and $d'_{m3}$ respectively with reference to the positions of the microphone arrays $m_1$ and $m_3$. The directions of the set initial values $x_n$ are respectively directions $d''_{m1}$, $d''_{m2}$, and $d''_{m3}$ respectively with reference to the positions of the microphone arrays $m_1$, $m_2$, and $m_3$. Accordingly, the localized sound source directions $d'_{m1}$, $d'_{m2}$, and $d'_{m3}$ estimated through sound source localization are respectively corrected to the estimated sound source directions $d''_{m1}$, $d''_{m2}$, and $d''_{m3}$. In addition, a direction vector [d ] having the localized sound source directions $d'_{m1}(\delta_1)$, $d'_{m2}(\delta_2)$, $d'_{m3}(\delta_3)$ as its elements is represented in the following Equation (18). Here, each of $\delta_1$, $\delta_2$, and $\delta_3$ is an integer from "1" to $D_m$.

$$[d'] = [d'_{m1}(\delta_1), d'_{m2}(\delta_2), d'_{m3}(\delta_3)]^T, m_1 \neq m_2 \neq m_3 \qquad (18)$$

(Process of Updating Estimated Sound Source Position)

Next, the process of updating estimated sound source positions will be described. Since a sound source direction estimated through sound source localization includes error, an estimated sound source position for each candidate sound source estimated from midpoints between the sound source directions also include error. When such error is random, the estimated sound source position and the midpoints are expected to be distributed around the real sound source position of each sound source. Thus, the sound source position updating unit 142 according to this embodiment performs clustering for midpoints between estimated sound source directions of every two microphone arrays and classifies a distribution of such midpoints into a plurality of clusters. Here, an estimated sound source direction represents a direction of an estimated sound source position. As a clustering technique, the sound source position updating unit 142, for example, uses k-means clustering. The sound source position updating unit 142 updates the estimated sound source positions such that an estimation probability that is a degree of possibility of an estimated sound source position for each sound source candidate being classified into a cluster corresponding to each sound source candidate increases.

(Probability Model)

When an estimated sound source position is calculated, the sound source position updating unit 142 uses a probability model based on a triangle division method. In this probability model, it is assumed that an estimation probability of an estimated sound source position for each sound source candidate being classified into a cluster corresponding to each sound source candidate can be approximated to be decomposed as being represented as a product having a first probability, a second probability, and a third probability as factors. The first probability is a probability that an estimated sound source direction that is a direction of an estimated sound source position of a sound source candidate corresponding to the sound source is acquired when a localized sound source direction is determined through sound source localization. The second probability is a probability that an estimated sound source position is acquired when a midpoint of half lines in the estimated sound source direction from the positions of two microphone arrays are determined. The third probability is a probability of the midpoint appearing in the classified cluster.

Figure 10:
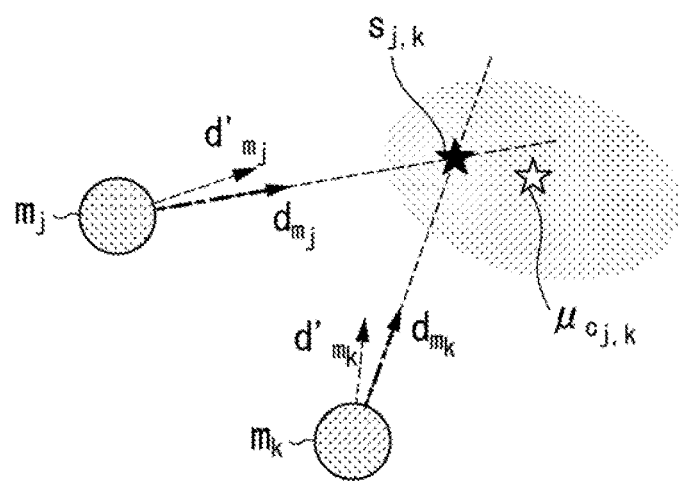
FIG. 10 is a conceptual diagram of a probability model relating to this embodiment.

More specifically, it is assumed that the first probability follows a von-Mises distribution with reference to localized sound source directions $d'_{mj}$ and $d'_{mk}$. In other words, the first probability is based on an assumption that error of which a probability distribution is a von-Mises distribution is included in the localized sound source directions d'$_{mj}$ and d'$_{mk}$ estimated from audio signals acquired by the microphone arrays m$_j$ and m$_k$ through sound source localization. Ideally, in the example illustrated in FIG. 10, when there is no error, real sound source directions d$_{mj}$ and d$_{mk}$ are acquired as localized sound source directions d'$_{mj}$, d'$_{mk}$. FIG. 10 is a conceptual diagram of a probability model relating to this embodiment.

The second probability is assumed to follow a multi-dimensional Gaussian function with reference to the positions of the microphone arrays m$_j$ and m$_k$ and a midpoint s$_j$ between the estimated sound source directions d$_{mj}$ and d$_{mk}$. In other words, the second probability is based on an assumption that Gauss noise is included as error of which a probability distribution is a multi-dimensional Gauss distribution at an estimated sound source position that becomes a midpoint s$_{j,k}$ of half lines, of which directions are respectively estimated sound source directions d$_{mj}$ and d$_{mk}$, that respectively pass through the microphone arrays m$_j$ and m$_k$. Ideally, the coordinates of the midpoint s$_{j,k}$ are an average value μ$_{cj,k}$ of the multi-dimensional Gaussian function.

Accordingly, the sound source position updating unit 142 estimates estimated sound source directions d$_{mj}$, d$_{mk}$ such that coordinates of the midpoint s$_{j,k}$ giving the estimated sound source direction of a sound source candidate is as close to the average value μ$_{cj,k}$ of the multi-dimensional Gaussian function approximating the distribution of the midpoint S$_{j,k}$ as possible on the basis of the localized sound source directions d'$_{mj}$ and d'$_{mk}$ acquired through sound source localization.

The third probability represents an appearance probability of a cluster cj,k into which a midpoint s$_{j,k}$ of half lines, of which directions are respectively estimated sound source directions d$_{mj}$ and d$_{mk}$, that passes through the microphone arrays m$_j$ and m$_k$. In other words, the third probability represents an appearance probability of an estimated sound source position corresponding to the midpoints s$_{j,k}$ in a cluster c$_{j,k}$.

In order to associate each cluster with a sound source, the sound source position updating unit 142 performs initial clustering for initial values of estimated sound source positions x$_n$ for sound source candidates, thereby determining the number C of clusters.

In the initial clustering, the sound source position updating unit 142, as represented in the following Equation (19), performs hierarchical clustering for an estimated sound source position x$_n$ for each sound source candidate using a threshold φ of a predetermined Euclid distance as a parameter, thereby classifying estimated sound source positions x$_n$ into a plurality of clusters. The hierarchical clustering is a technique of generating a plurality of clusters including only one piece of target data as an initial state, calculating a Euclid distance between two clusters including different correspondence data, and forming a new cluster by sequentially merging clusters having a shortest calculated Euclid distance. The process of merging clusters is repeated until the Euclid distance reaches a threshold φ. As the threshold φ, for example, a value larger than an estimated error in the sound source position may be set in advance. Accordingly, a plurality of sound source candidates having a distance shorter than the threshold φ is put together in one cluster, and each cluster is associated with a sound source. The number C of clusters acquired through clustering is estimated to be the number of sound sources.

$$c_n = \text{hierarchy}(x_n, \varphi)$$

$$C = \max(c_n) \quad (19)$$

In Equation (19), hierarchy represents hierarchy clustering. In addition, c$_n$ represents an index c$_n$ of each cluster acquired through clustering. max( . . . ) represents a maximum value of " . . . ".

Next, an application example of a probability model will be described. As described above, for each microphone array m$_1$, a first probability (d'$_{m1}$, d$_{mi}$; β$_{mi}$) at which an estimated sound source direction d$_{mi}$ is acquired when the localized sound source direction d'$_{mi}$ is determined is assumed to follow a von-Mises distribution represented in the following Equation (20).

$$f(d'_{m_i}, d_{m_i}; \beta_{m_i}) = \frac{\exp(\beta(d'_{m_i} \cdot d_{m_i}))}{2\pi I_0(\beta_{m_i})} \quad (20)$$

The von-Mises distribution is a continuous function having "1" and "0" respectively as a maximum value and a minimum value and takes the maximum value "1" when the localized sound source direction d'$_{mi}$ and the estimated sound source direction d$_{mi}$ are the same, and the function value decreases as an angle formed by the localized sound source direction d'$_{mi}$ and the estimated sound source direction d$_{mi}$ becomes larger. In Equation (20), each of the sound source direction d'$_{mi}$ and the estimated sound source direction d$_{mi}$ is represented as a unit vector of which magnitude is normalized to "1." β$_{mi}$ represents a shape parameter representing enlargement of a function value. As the shape parameter β$_{mi}$ increases, the first probability approximates to a normal distribution, and, as the shape parameter β$_{mi}$ decreases, the second probability approximates to a uniform distribution. I$_0$(β$_{mi}$) represents a first-kind modified Bessel function of order 0. The von-Mises distribution is appropriate for modeling a distribution of noise added at an angle as that of the sound source direction. In a probability model, the shape parameter β$_{mi}$ is set as one of model parameters.

As the entire audio processing system S1, a probability p([d']|[d]) of acquiring an estimated sound source direction [d] under the localized sound source direction [d'], as represented in the following Equation (21), is assumed to be an infinite product of the first probabilities f(d'$_{mi}$, d$_{mi}$; β$_{mi}$) between microphone arrays m$_i$.

$$p([d'][d]) = \prod_i f(d'_{m_i}, d_{m_i}; \beta_{m_i}) \quad (21)$$

Here, the localized sound source direction [d'] and the estimated sound source direction [d] are vectors respectively including a localized sound source direction d'mi and an estimated sound source direction d$_{mi}$ as its elements.

In addition, in the probability model, when microphone arrays m$_j$ and m$_k$ and a midpoint s$_{j,k}$ between the estimated sound source directions d$_{mj}$ and d$_{mk}$ are acquired, a second probability p(s$_{j,k}$|c$_{j,k}$) of acquiring an estimated sound source position corresponding to a cluster c$_{j,k}$ into which the midpoint s$_{j,k}$ is classified is assumed to follow a multivariate Gaussian distribution N(s$_{j,k}$;μ$_{cj, k}$, Σ$_{cj,k}$) represented in the following Equation (22). μ$_{cj,k}$ and Σ$_{cj,k}$ respectively represent an average and dispersion of the multivariate Gaussian distribution. This average represents a magnitude and a deviation of the distribution of estimated sound source positions. The midpoint s$_{j,k}$, as described above, is a function set using the positions u$_j$ and u$_k$ and the estimated sound source directions d$_{mj}$, d$_{mk}$ of the microphone arrays m$_j$ and $m_k$. In the following description, the position of the midpoint may be represented as $g(d_{mj}, d_{mk})$. In the probability model, an average $\mu_{cj,k}$ and dispersion $\Sigma_{cj,k}$ are some of model parameters.

$$p(s_{j,k}|c_{j,k}) = N(s_{j,k}; \mu_{cj,k}, E_{cj,k}) \quad (22)$$

In the entire audio processing system S1, when a distribution of midpoints between estimated sound source directions [d] of every two microphone arrays is acquired, a probability p([d]|[c]) of acquiring a cluster[c] corresponding to each candidate sound source, as represented in the following Equation (22), is assumed to be approximated to an infinite product of second probabilities $p(s_{j,k}|c_{j,k})$ between midpoints. [c] is a vector including a cluster $c_{j,k}$ as its element.

$$P([d][c]) = \prod_{d_j, d_k, m_j \neq m_k} p(d_{m_j}, d_{m_k} | c_{j,k}) \quad (23)$$
$$= \prod_{d_j, d_k, m_j \neq m_k} p(g(d_{m_j}, d_{m_k}) | c_{j,k})$$
$$= \prod_{j,k, m_j \neq m_k} p(s_{j,k} | c_{j,k})$$

In addition, in the probability model, as a third probability, a probability $p(c_{j,k})$ of appearance of a cluster $c_{j,k}$ into which a midpoint $s_{j,k}$ between estimated sound source directions $d_{mj}$, $d_{mk}$ of two microphone arrays $m_j$, $m_k$ is classified is set as one model parameter. The parameter may be denoted as $\mu_{cj,k}$.

(Update of Sound Source Position)

Next, a process of updating a sound source position using the probability model described above will be described.

The sound source position updating unit 142 recursively updates an estimated sound source position [d] such that an estimation probability p([c],[d],[d']) at which the estimated sound source position [d] for each sound source candidate is classified into a cluster [c] corresponding to each sound source candidate increases when a localized sound source direction [d'] is acquired through sound source localization. The sound source position updating unit 142 performs clustering for a distribution of midpoints between estimated sound source directions of every two microphone arrays and classifies the midpoints into clusters [c].

In order to update the estimated sound source position [d], the sound source position updating unit 142 uses a technique applying Viterbi training.

The sound source position updating unit 142 sequentially repeats the process of calculating an estimated sound source position [d*] and a cluster [c*] for maximizing an estimation probability p([c],[d],[d'];[μ*],[Σ]*,[β*]) with model parameters [μ*], [Σ*], and [β*] fixed as represented in the following Equation (23) and the process of calculating model parameters [π*],[μ*],[Σ*], and [β*] for maximizing an estimation probability p([c*],[d*],[d'];[μ],[Σ],[β]) with the estimated sound source position [d*] and the cluster [c*] that have been calculated with fixed as represented in the following Equation (24). Here, . . . * represents a maximized parameter . . . . Here, maximizing represents macroscopically increasing or a process for the purpose thereof and there may be also cases in which temporary decreasing or locally decreasing occurs in accordance with the process.

$$[c^*], [d^*] \leftarrow \arg\max_{[c],[d]} p\left([c], [d], [d']; [\mu^*], [\overset{*}{\sum}], [\beta^*]\right) \quad (24)$$

$$[\pi], [\mu^*], [\overset{*}{\sum}], [\beta^*] \leftarrow \arg\max_{[\mu],[\Sigma][\beta]} p\left([c^*], [d^*][d']; [\mu], [\sum], [\beta]\right) \quad (25)$$

A right side of Equation (23) is transformed as represented in the following Equation (25) by substituting Equations (20) to (22).

$$[c^*], [d^*] \leftarrow \arg\max_{[c],[d]} p\left([c], [d], [d']; [\mu^*], [\overset{*}{\sum}], [\beta^*]\right) = \quad (26)$$
$$\arg\max_{[c],[d]} p([d'], [d]) p([d][c]) p([c]) =$$
$$\arg\max_{[c],[d]} \prod_i f(d'_{m_i}, d_{m_i}; \beta^*_i) \prod_{d_j, d_k, m_i \neq m_k} p(d_{m_j}, d_{m_k} | c_{j,k}) p(c_{j,k}) =$$
$$\arg\max_{[c],[d]} \prod_i f(d'_{m_i}, d_{m_i}; \beta^*_i) \cdot$$
$$\prod_{d_j, d_k, m_i \neq m_k} N\left([g(d_{m_j}, d_{m_k})]; [\mu^*_{c_{j,k}}], [\overset{*}{\sum_{c_{j,k}}}]\right) p(c_{j,k})$$

As represented in Equation (25), the estimation probability p([c],[d],[d']) is represented as a product having the first probability, the second probability, and the third probability described above as its factors. However, a factor of which a value is equal to or smaller than zero is not set as a multiplication target in Equation (25).

A right side of Equation (25), as represented in the following Equations (26) and (27), is decomposed into a function of a cluster $c_{j,k}$ and a function of a sound source direction [d]. Accordingly, the cluster $c_{j,k}$ and the estimated sound source direction [d] can be individually updated.

$$c^*_{j,k} \leftarrow N\left([g(d^*_{m_j}, d^*_{m_k})]; [\mu^*_{c_{j,k}}], [\overset{*}{\sum_{c_{j,k}}}]\right) \quad (27)$$
$$p(c_{j,k}) \sim \arg\max_{c_{j,k}} (-[g(d^*_{m_j}, d^*_{m_k})] - [\mu^*_{c_{j,k}}])^T [\overset{*}{\sum_{c_{j,k}}}]^{-1} \cdot$$
$$([g(d^*_{m_j}, d^*_{m_k})] - [\mu^*_{c_{j,k}}]) p(c_{j,k})$$

$$[d^*] \leftarrow \arg\max_{[d]} \quad (28)$$
$$\prod_i f(d'_{m_i}, d_{m_i}; \beta^*_{m_i}) \cdot \prod_{d_j, d_k, m_j \neq m_k} N([g(d_{m_j}, d_{m_k})]; [\mu^*_{c_{j,k}}]) p(c_{j,k})$$

The sound source position updating unit 142 classifies all the midpoints (included intersections) $g(d^*_{mj}, d^*_{mk})$ into clusters [c*] having clusters $c^*_{j,k}$ as their elements such that the value of the right side of Equation (26) is further increased. When determining the clusters $c^*_{j,k}$, the sound source position updating unit 142 performs hierarchical clustering.

The hierarchical clustering is a technique for sequentially repeating a process of calculating a distance between every two clusters and generating a new cluster by merging two clusters having the shortest distance. At this time, the sound source position updating unit 142 uses a shortest distance among distances between a midpoint $g(d^*_{mj}, d^*_{mk})$ classified into one cluster and an averages $\mu_{cj',k'}$ that is the center of the other cluster $c_{j',k'}$ as a distance between two clusters.

Generally, an estimated sound source direction [d] has high dependency on the other variables, and it is difficult to analytically calculate an optimal value. Thus, the right side of Equation (27), as represented in the following Equation (28), is decomposed into a function of estimated sound source directions $d_{mi}$ as an approximation. The sound source position updating unit 142 updates individual estimated sound source directions $d_{mi}$ such that values appearing in the third to fifth rows of the right side of Equation (24) are further increased as cost function.

$$d^*_{m_i} \leftarrow \underset{d_{m_i}}{\arg\max} \tag{29}$$

$$f(d'_{m_i}, d_{m_j}; \beta^*_{m_i}) \cdot \prod_{d_{m_i}, d_{m_j}, m_i \neq m_j} N\left([g(d_{m_i}, d_{m_j})]; [\mu^*_{c_{i,j}}], [\overset{*}{\sum}_{c_{j,k}}]\right)$$

$$p(c_{i,j}) \sim \underset{d_{m_i}}{\arg\max} \{\beta^*_{m_i}(d'_{m_i}, d_{m_j}) \cdot - \sum_{d_{m_i}, d_{m_j}, m_i \neq m_j}$$

$$([g(d_{m_i}, d_{m_j})] - [\mu^*_{c_{i,j}}])^T [\overset{*}{\sum}_{c_{i,j}}]^{-1}$$

$$([g(d_{m_i}, d_{m_j})] - [\mu^*_{c_{i,j}}]) + \log p(c_{i,j})$$

When the estimated sound source directions $d_{mi}$ are updated, the sound source position updating unit 142 searches for estimated sound source directions $d^*_{mi}$ using a gradient descent method under constraint conditions (c1) and (c2) to be described next.

(c1) Each of localized sound source directions [d'] estimated through sound source localization approximates to a real sound source direction [d] corresponding thereto.

(c2) An average $\mu_{cj,k}$ corresponding to an estimated sound source position is inside an area of a triangle having three midpoints $P_j$, $P_k$, and $P_i$ based on estimated sound source directions $d^*_{mj}$, $d^*_{mk}$, and $d^*_{mi}$ that have been updated immediately before as its vertexes. Here, a microphone array mi is a microphone array that is separate from microphone arrays $m_j$ and $m_k$.

Figure 11:
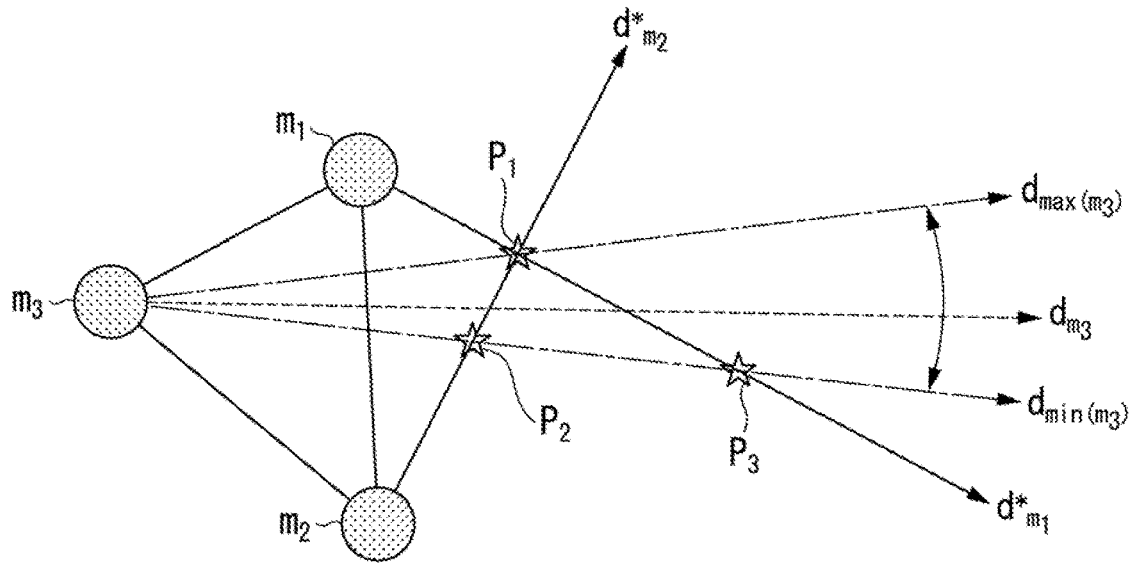
FIG. 11 is an explanatory diagram of a search for a sound source direction according to this embodiment.

For example, when the estimated sound source direction $d_{m3}$ is updated, as illustrated in FIG. 11, the sound source position updating unit 142 determines an estimated sound source direction $d_{m3}$ in which the cost function described above has a largest value within a range of a direction having a direction of the midpoint $P_2$ from the microphone array $m_3$ as a start point $d_{min(m3)}$ and having a direction of the midpoint $P_1$ from the microphone array $m_3$ as an end point $d_{max(m3)}$ as an estimated sound source direction $d^*_{m3}$. FIG. 11 is an explanatory diagram of a search for a sound source direction according to this embodiment. Also, when the sound source directions $d_{m1}$ and $d_{m2}$ and the like are updated, the sound source position updating unit 142 searches for estimated sound source directions $d_{mi}$ and $d_{m2}$ in which the cost function has the largest value by applying the same constraint condition. In other words, the sound source position updating unit 142 searches for an estimated sound source direction $d^*_{m1}$ in which the cost function has the largest value within a range having a direction of the midpoint $P_3$ from the microphone array mi as a start point $d_{min(m1)}$ and having a direction of the midpoint $P_2$ as an end point $d_{max(m1)}$. The sound source position updating unit 142 searches for an estimated sound source direction $d^*_{m2}$ in which the cost function has the largest value within a range of a direction having a direction of the midpoint $P_1$ from the microphone array $m_2$ as a start point $d_{min(m2)}$ and having a direction of the midpoint $P_3$ as an end point $d_{max(m2)}$. Accordingly, an area for searching for an estimated sound source direction is restricted within a search area set on the basis of the estimated sound source direction $d^*_{m1}$ updated immediately before and the like, and therefore, the amount of calculation can be reduced. In addition, an instability of a solution according to non-linearity of the cost function is avoided.

In addition, the right side of Equation (24) is transformed as represented in the following Equation (29) by substituting Equations (20) to (22) therein. The sound source position updating unit 142 updates model parameter sets $[\pi^*]$, $[\mu^*]$, $[\Sigma^*]$, and $[\beta^*]$ such that a value of the right side of Equation (29) increases.

$$[\pi^*], [\mu^*], [\overset{*}{\sum}], [\beta^*] \leftarrow \underset{[\mu],[\Sigma][\beta]}{\arg\max} \prod_i f(d'_{m_i}, d^*_{m_i}; \beta_{m_i}) \cdot \tag{30}$$

$$\prod_{d^*_{m_j}, d^*_{m_k}, m_j \neq m_k} N\left([g(d^*_{m_j}, d^*_{m_k})]; [\mu^*_{c_{j,k}}], [\overset{*}{\sum}_{c_{j,k}}]\right) p(c^*_{j,k})$$

In order to further increase the value of the right side of Equation (29), the sound source position updating unit 142 can calculate the model parameters $\pi^*_c$, $\mu^*_c$, and $\Sigma^*_c$ of each cluster c and the model parameter $\beta^*m$ of each microphone array m on the basis of the localized sound source direction [d'], the updated estimated sound source direction [d*], and the updated cluster [c*] using a relationship represented in the following Equation (30).

$$\pi^*_c \leftarrow N_c/N \tag{31}$$

$$\mu^*_c \leftarrow \sum_{c_{j,k}=c} g(d^*_{m_j}, d^*_{m_k})/N_c$$

$$\overset{*}{\sum}_c \leftarrow \sum_{c_{j,k}=c} (g(d^*_{m_j}, d^*_{m_k}) - \mu_c)^2/N_c$$

$$\beta^*_m \leftarrow \sum_{m_i=m} d'_{m_i} \cdot d^*_{m_i}/N_m, \text{ Here, } N_m = \sum_{m_i=m} 1$$

In Equation (30), the model parameter $\pi^*_c$ represents the ratio of the number of sound source candidates $N_c$ of which estimated sound source positions belong to a cluster c to the number of sound source candidates N, in other words, the probability of appearance in a cluster c into which estimated sound sources are classified. The model parameter $\mu^*_c$ represents an average value of coordinates of midpoints $s_{j,k}$ ($=g(d^*_{mj}, d^*_{mk})$) belonging to a cluster c, in other words, the center of the cluster c. The model parameter $\mu^*_c$ represents dispersion of coordinates of the midpoints $s_{j,k}$ belonging to a cluster c. The model parameter $\beta^*_m$ represents an average value of inner products of localized sound source directions $d'_{mi}$ and estimated sound source directions $d^*_{mi}$ for the microphone arrays i.

Next, one example of the sound source position updating process according to this embodiment will be described.

Figure 12:
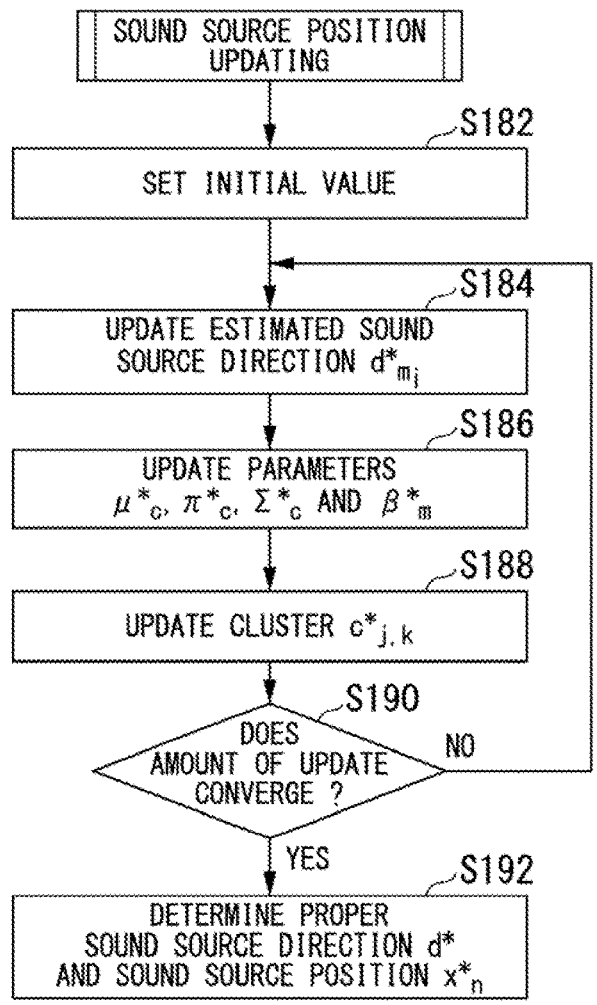
FIG. 12 is a flowchart illustrating one example of a sound source position updating process according to this embodiment.

FIG. 12 is a flowchart illustrating one example of the sound source position updating process according to this embodiment.

(Step S182) The sound source position updating unit 142 sets various initial values relating to an update process. The sound source position updating unit 142 sets an initial value of an estimated sound source position for each sound source candidate represented by initial estimated sound source position information input from the initial value setting unit 140. In addition, the sound source position updating unit 142 sets the initial value [d] of the estimated sound source position, the initial value [c] of the cluster, the initial value $\pi^*_c$ of the appearance probability, the initial value $\mu^*_c$ of the average, the initial value $\Sigma^*_c$ of the dispersion, and the initial value $\beta^*_m$ of the shape parameter as represented in the following Equation (31). As the initial value [d] of the estimated sound source direction, a localized sound source direction [d'] is set. As the initial value $c_{j,k}$ of the cluster, a cluster $c_n$ to which the initial value $x_n$ of the sound source estimated position belongs is set. As the initial value $\pi^*_c$ of the appearance probability, the reciprocal of the number of clusters C is set. As the initial value $\mu^*_c$ of the average, an average value of initial values $x_n$ of sound source estimated positions to which the cluster c belongs is set. As the initial value $\Sigma^*_c$ of the dispersion, a unit matrix is set. As the initial value $\beta^*_m$ of the shape parameter, "1" is set. Thereafter, the process proceeds to the process of Step S184.

$$[d] \leftarrow [d'] \quad (32)$$
$$c_{j,k} \leftarrow c_n$$
$$\pi^*_c \leftarrow 1/C$$
$$\mu^*_c \leftarrow \sum_{c_n=c} x_n/N_c$$
$$\sum^*_c \leftarrow \begin{pmatrix} 1 & 0 \\ 0 & 1 \end{pmatrix}$$
$$\beta^*_m \leftarrow 1$$

(Step S184) The sound source position updating unit 142 updates estimated sound source directions $d^*_{mi}$ such that the value of the cost function represented in the right side of Equation (24) increases under the constraint condition described above. Thereafter, the process proceeds to the process of Step S186.

(Step S186) The sound source position updating unit 142 calculates the appearance probability $\pi^*_c$, the average $\mu^*_c$, and the dispersion $\Sigma^*_c$ of each cluster c and the shape parameter $\beta^*_m$ of each microphone array m using the relationship represented in Equation (26). Thereafter, the process proceeds to the process of Step S188.

(Step S188) The sound source position updating unit 142 determines a midpoint $g(d^*_{mj}, d^*_{mk})$ from the updated estimated sound source directions $d^*_{mj}$ and $d^*_{mk}$. The sound source position updating unit 142 performs clustering of a distribution of midpoints $(d^*_{mj}, d^*_{mk})$ such that the value of the cost function represented in the right side of Equation (22) increases and classifies the midpoints into a plurality of clusters $c_{j,k}$. Thereafter, the process proceeds to the process of Step S190.

(Step S190) The sound source position updating unit 142 calculates the amount of update of one or both of the sound source direction $d^*_{mi}$ and the average $\mu_{cj,k}$ that is the estimated sound source position $x^*_n$ and determines whether or not the calculated amount of update is smaller than a predetermined amount of update, thereby determining converging or not. The amount of update, for example, may be one of a sum of squares of differences between the sound source directions $d^*_{mi}$ before and after update between microphone arrays mi and a sum of squares of differences of averages $\mu_{cj,k}$ before and after update between clusters c or one of weighted sums thereof. In a case in which convergence is determined (Step S190: Yes), the process proceeds to the process of Step S192. On the other hand, in a case in which no conversion is determined (Step S190: No), the process is returned to the process of Step S184.

(Step S192) The sound source position updating unit 142 sets an updated estimated sound source position $x^*_n$ as a most probable sound source position. The sound source position updating unit 142 outputs estimated sound source position information representing an estimated sound source position for each sound source candidate to the sound source identifying unit 16. The sound source position updating unit 142 may set an updated estimated sound source direction [d*] as a most probable sound source direction and output estimated sound source position information representing an estimated sound source direction for each sound source candidate to the sound source identifying unit 16. In addition, the sound source position updating unit 142 may further output estimated sound source position information with sound source identification information for each sound source candidate included therein. In the sound source identification information, at least any one of indexes representing three microphone arrays relating to initial values of estimated sound source positions of sound source candidates and at least any one of indexes representing sound sources estimated through sound source localization for each microphone array may be included. Thereafter, the process illustrated in FIG. 12 ends.

(Process of Sound Source Identifying Unit)

Figure 13:
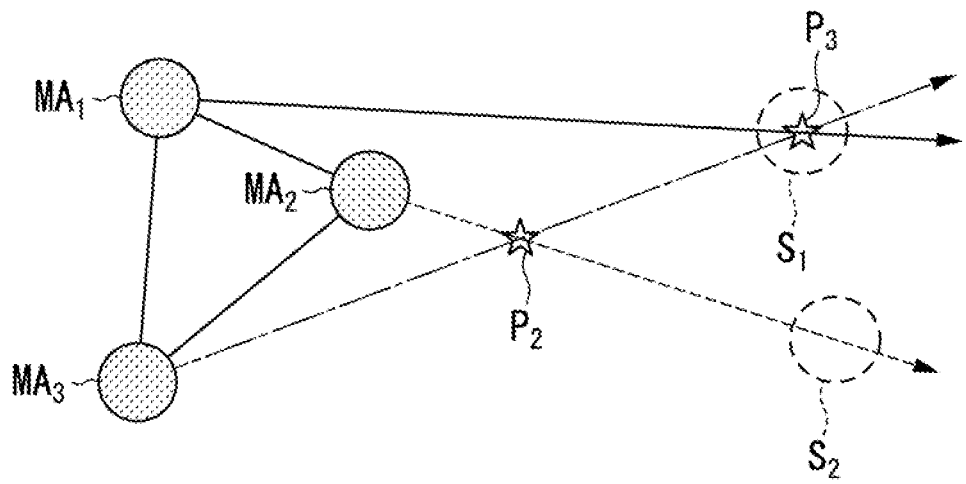
FIG. 13 is a diagram illustrating an example of detection of a virtual image.

Next, the process of the sound source identifying unit 16 according to this embodiment will be described. The sound source position updating unit 142 sets an estimated sound source position on the basis of three midpoints in the sound source directions acquired by every two microphone arrays among three microphone arrays. However, sound source directions may be independently estimated using an audio signal acquired from each microphone array. For this reason, there are cases in which the sound source position updating unit 142, for every two microphone arrays, sets a midpoint in sound source directions of mutually-different sound sources. Since the midpoint is generated at a position different from a position at which the sound source is actually present, there are cases in which a so-called ghost (virtual image) is detected. For example, in an example illustrated in FIG. 13, sound source directions are estimated to be directions of sound sources S1, S2, and S1 by the microphone arrays MA1, MA2, and MA3. FIG. 13 is a diagram illustrating an example of detection of a virtual image. In this case, all the midpoints $P_3$ according to the microphone arrays $MA_1$ and $MA_3$ are determined on the basis of the direction of a sound source $S_1$ and thus approximate to the position of the sound source $S_1$. However, midpoints $P_2$ according to the microphone arrays $MA_2$ and $MA_3$ are respectively determined on the basis of the directions of sound sources $S_2$ and $S_1$ and thus are located at positions separate from any one of the sound sources $S_1$ and $S_2$.

Thus, the sound source identifying unit 16 classifies spectrums of individual sound source signals of sound sources for each microphone array into a plurality of second clusters and determines whether or not sound sources relating to the spectrums to which the second clusters belong are the same. The sound source identifying unit 16 selects the estimated sound source position of the sound sources that have been determined to be the same with priority over sound sources determined not to be the same. In this way, it can be prevented to erroneously estimate a sound source position due to detection of a virtual image.

(Frequency Analysis)

Figure 14:
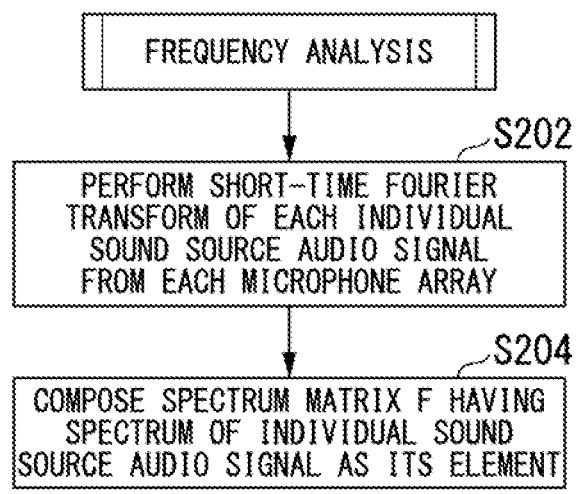
FIG. 14 is a flowchart illustrating one example of a frequency analysis process according to this embodiment.

The frequency analyzing unit 124 performs a frequency analysis for an audio signal of an individual sound source separated for each sound source. FIG. 14 is a flowchart illustrating one example of a frequency analysis process according to this embodiment (Step S202) The frequency analyzing unit 124 performs a short-time Fourier transform for an individual sound source audio signal of each sound source separated from an audio signal acquired from each microphone array m for every frame, thereby calculating spectrums [$F_{m,1}$] and [$F_{m,2}$] to [$F_{m,sm}$]. Thereafter, the process proceeds to the process of Step S204.

(Step S204) The frequency analyzing unit 124 integrates frequency spectrums calculated for the sound sources between rows for each microphone array m, thereby configuring a spectrum matrix [$F_m$]. The frequency analyzing unit 124 integrates spectrum matrixes [$F_m$] for the microphone arrays m between rows, thereby configuring a spectrum matrix [F]. The frequency analyzing unit 124 outputs the configured spectrum matrix [F] and the sound source direction information to the sound source identifying unit 16 in association with each other. Thereafter, the process illustrated in FIG. 10 ends.

(Score Calculation)

The dispersion calculating unit 160 and the score calculating unit 162 of the sound source identifying unit 16 perform a score calculating process to be illustrated next as an example.

Figure 15:
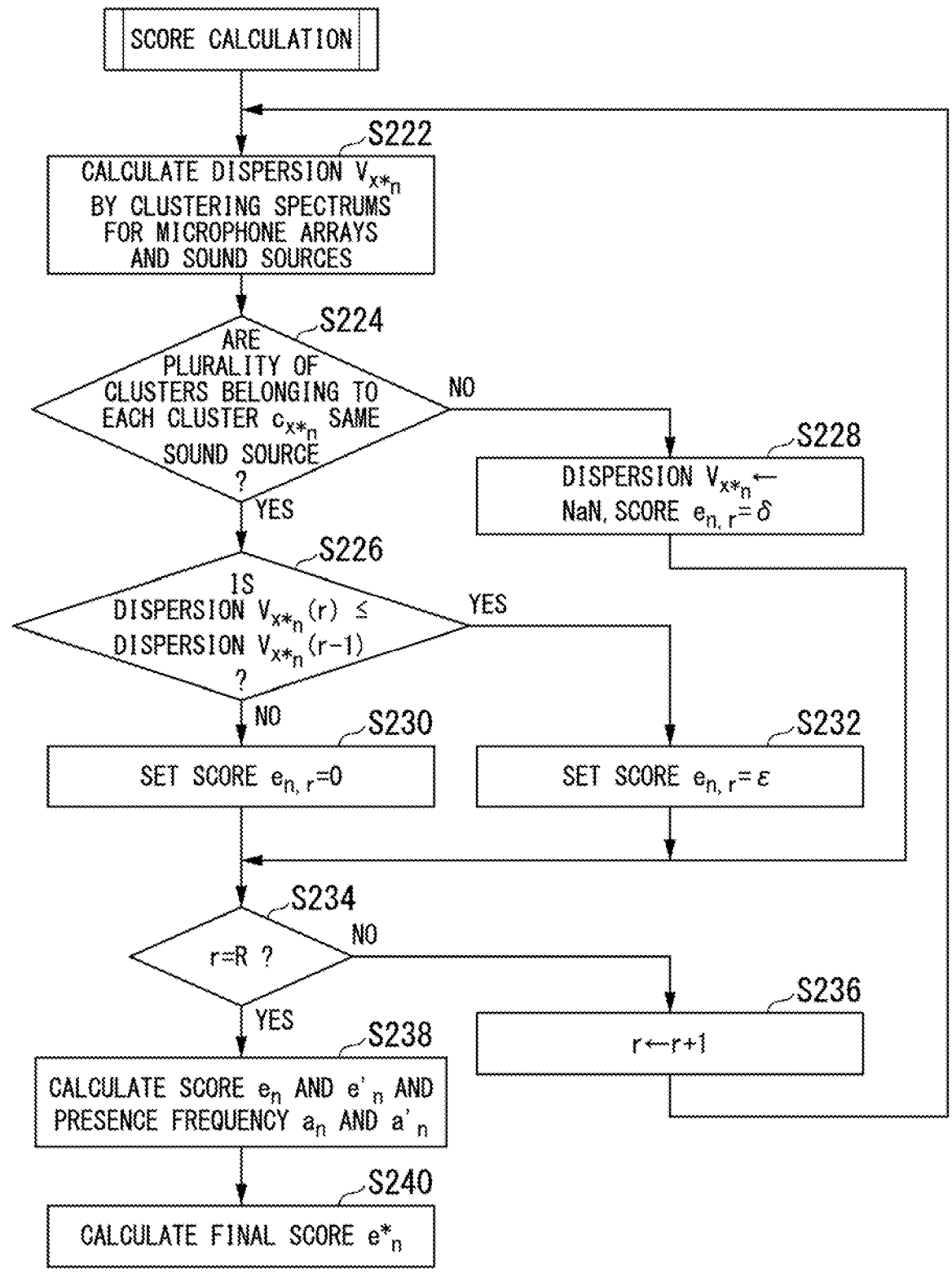
FIG. 15 is a flowchart illustrating one example of a score calculation process according to this embodiment.

FIG. 15 is a flowchart illustrating one example of the score calculation process according to this embodiment.

(Step S222) The dispersion calculating unit 160 performs clustering for spectrums for microphone arrays m and sets of sound sources represented by a spectrum matrix [F] input from the frequency analyzing unit 124 using the k-means clustering, thereby classifying the spectrums into a plurality of second clusters. The number of clusters K is set in the dispersion calculating unit 160 in advance. However, the dispersion calculating unit 160 changes the initial value of the cluster for each spectrum for every number of times of repetition r. The number of clusters K may be configured to be the same as the number of sound source candidates N. The dispersion calculating unit 160 configures a cluster matrix [c*] including indexes $c_{i,x^*_n}$ of second clusters classified for each spectrum as its elements. Each column and each row of the cluster matrix [c*] are respectively associated with a microphone array i and a sound source $x^*_n$. In a case in which the number of microphone arrays M is three, the cluster matrix [c*], as illustrated in the following Equation (32), is a matrix of N rows and three columns.

$$[c^*] = \begin{bmatrix} c_{1,x^*_1} & c_{2,x^*_1} & c_{3,x^*_1} \\ c_{1,x^*_2} & c_{2,x^*_2} & c_{3,x^*_2} \\ \vdots & \vdots & \vdots \\ c_{1,x^*_N} & c_{2,x^*_N} & c_{3,x^*_N} \end{bmatrix}_{N \times 3} \quad (33)$$

The dispersion calculating unit 160 identifies a second cluster corresponding to each sound source candidate on the basis of the sound source identification information for each sound source candidate represented by the estimated sound source position information input from the sound source position updating unit 142.

For example, the dispersion calculating unit 160 can identify a second cluster represented by an index disposed in a column of a microphone array and a row of a sound source included in the cluster matrix among columns of microphone arrays and sound source columns represented by the sound source identification information in the cluster matrix.

The dispersion calculating unit 160 calculates dispersion $V_{x^*_n}$ of estimated sound source positions for each sound source candidate corresponding to the second cluster. Thereafter, the process proceeds to the process of Step S224.

(Step S224) The dispersion calculating unit 160 determines whether or not sound sources relating to a plurality of spectrums that have been classified are the same sound source for each of the second clusters $c_{x^*_n}$.

For example, when each degree of similarity represented by an index representing a degree of similarity between two spectrums among a plurality of spectrums is higher than a predetermined degree of similarity, the dispersion calculating unit 160 determines that the sound sources are the same. On the other hand, when an index representing a degree of similarity between at least one set of spectrums is equal to or lower than a predetermined degree of similarity, the dispersion calculating unit 160 determines that the sound sources not the same. As an index of a degree of similarity, for example, an inner product, an Euclid distance, or the like can be used. In a case in which the value of the inner product is larger, it represents that the degree of similarity is higher. In a case in which the value of the Euclid distance is smaller, it represents that the degree of similarity is lower. In addition, as an index of a degree of similarity of a plurality of spectrums, the dispersion calculating unit 160 may calculate dispersion thereof. The dispersion calculating unit 160 may determine that the sound sources are the same when the dispersion is smaller than a predetermined threshold of dispersion and may determine that the sound sources are not the same when the dispersion is equal to or larger than the threshold. In a case in which it is determined that the sound sources are the same (Step S224: Yes), the process proceeds to the process of Step S226. On the other hand, in a case in which it is determined that the sound sources are not the same (Step S224: No), the process proceeds to the process of Step S228.

(Step S226) The dispersion calculating unit 160 determines whether or not dispersion $V_{x^*_n}(r)$ calculated for the second cluster $c_{x^*_n}$ at the current number of times of repetition r is equal to or less than dispersion $V_{x^*_n}(r-1)$ calculated at the previous number of times of repetition r−1. In a case in which it is determined that the dispersion $V_{x^*_n}(r)$ is equal to or smaller than the dispersion $V_{x^*_n}(r-1)$ (Step S226: Yes), the process proceeds to the process of Step S232. On the other hand, in a case in which it is determined that the dispersion $V_{x*_n}(r)$ is larger than the dispersion $V_{x*_n}(r-1)$ (Step S226: No), the process proceeds to the process of Step S230.

(Step S228) The dispersion calculating unit 160 sets the dispersion $V_{x*_n}(r)$ of the second cluster $c_{x*_n}$ at the current number of times of repetition r to NaN and sets a score $e_{n,r}$ to δ. Here, NaN is a symbol (not a number) representing that the dispersion is invalid. In addition, δ is a predetermined real number that is smaller than zero. Thereafter, the process proceeds to Step S234.

(Step S230) The dispersion calculating unit 160 sets the score $e_{n,r}$ of the second cluster $c_{x*_n}$ at the current number of times of repetition r to zero. Thereafter, the process proceeds to the process of Step S234.

(Step S232) The dispersion calculating unit 160 sets the score $e_{n,r}$ of the second cluster $c_{x*_n}$ at the current number of times of repetition r to ε. Thereafter, the process proceeds to the process of Step S234.

(Step S234) The dispersion calculating unit 160 determines whether or not the current number of times of repetition r has reached a predetermined number of times of repetition R. In a case in which it is determined that the current number of times of repetition r has not reached the predetermined number of times of repetition R (Step S234: No), the process proceeds to the process of Step S236. On the other hand, in a case in which it is determined that the current number of times of repetition r has reached the predetermined number of times of repetition R (Step S234: Yes), the dispersion calculating unit 160 outputs a score of each time and score calculation information representing an estimated sound source position for each second cluster to the score calculating unit 162, and the process proceeds to the process of Step S238.

(Step S236) The dispersion calculating unit 160 increases the current number of times of repetition r by one.

Thereafter, the process is returned to the process of Step S222.

(Step S238) The score calculating unit 162, as represented in the following Equation (33), calculates a total value en of the scores $e_{n,r}$ for the second clusters $c_{x*_n}$ on the basis of the score calculation information input from the dispersion calculating unit 160. The score calculating unit 162 calculates a total sum $e'_n$ of total values $e_i$ of second clusters i corresponding to estimated sound source positions $x_i$ of which coordinate values $x_n$ are within a predetermined range. The reason for this is for integrating second clusters corresponding to estimated sound source positions of which coordinate values are the same or within a predetermined range as one second cluster. The reason for the occurrence of second clusters corresponding to estimated sound source positions of which coordinate values are the same or within a predetermined range is that, generally, a sound generation period from each one sound source is longer than a frame length relating to a frequency analysis, and frequency characteristics change.

$$e_n = \sum_r e_{n,r} \tag{34}$$

$$e'_n = \sum_i e_i, \text{ Here, } x_i^* \sim x_n^*, i = 1, 2, \ldots, N$$

The score calculating unit 162, as represented in the following Equation (34), counts the number of times of calculation of valid dispersion for each second cluster $c_{x*_n}$ as a presence frequency $a_n$ on the basis of the score calculation information input from the dispersion calculating unit 160. The score calculating unit 162 can determine whether or not valid dispersion has been calculated on the basis of whether NaN is set in the dispersion $V_{x*_n}(r)$. $a_{n,r}$ of the right side of a first row of Equation (30) is "0" for the number of times of repetition r in which NaN has been set and is "1" for the number of times of repetition r in which NaN has not been set.

The score calculating unit 162 calculates a total sum $a'_n$ of presence frequencies of second clusters i corresponding to estimated sound source positions $x_i$ of which coordinate values $x_n$ are within a predetermined range. Thereafter, the process proceeds to the process of Step S240.

$$a_n = \sum_r a_{n,r} \tag{35}$$

$$a'_n = \sum_i a_i, \text{ Here, } x_i^* \sim x_n^*, i = 1, 2, \ldots, N$$

(Step S240) The score calculating unit 162, as represented in the following Equation (35), calculates a final score $e^*_n$ by dividing the total sum $e'_n$ of scores for the integrated second clusters n by the total sum $a'_n$ of the presence frequencies. The integrated second clusters n correspond to individual sound source candidates.

The score calculating unit 162 outputs final score information representing the calculated final score and an estimated sound source position for each sound source candidate to the sound source selecting unit 164. Thereafter, the process illustrated in FIG. 15 ends.

$$e^*_n = e'_n/a'_n \tag{36}$$

In the example described above, although an example of a case in which the score $e_{n,r}$ is respectively set to δ, 0, and ε in Steps S228, S230, and S232, the settings are not limited thereto. The magnitude relationship of the values of the scores $e_{n,r}$ set in Steps S228, S230, and S232 may be in the ascending order.

(Sound Source Selection)

The sound source selecting unit 164 performs a sound source selection process illustrated next as an example.

Figure 16:
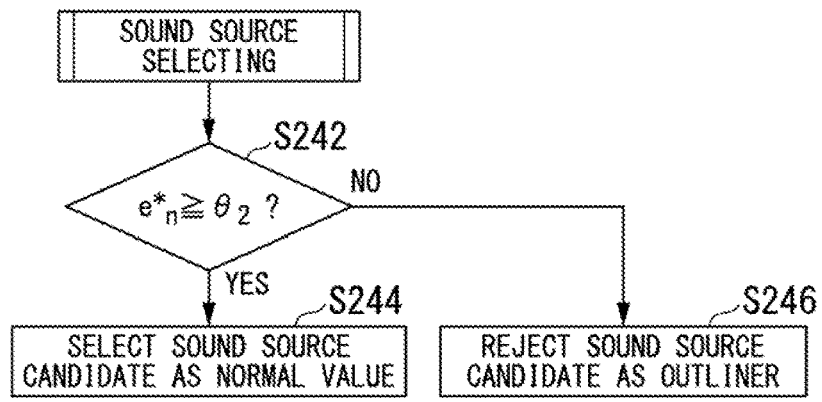
FIG. 16 is a flowchart illustrating one example of a sound source selection process according to this embodiment.

FIG. 16 is a flowchart illustrating one example of the sound source selection process according to this embodiment.

(Step S242) The sound source selecting unit 164 determines whether or not the final score $e^*_n$ of the sound source candidate represented by the final score information input from the score calculating unit 162 is equal to or higher than a predetermined threshold $θ_2$ of the final score. In a case in which it is determined that the final score is equal to or higher than the threshold $θ_2$ (Step S242: Yes), the process proceeds to the process of Step S244. On the other hand, in a case in which it is determined that the final score is lower than the threshold $θ_2$ (Step S242: No), the process proceeds to the process of Step S246.

(Step S244) The sound source selecting unit 164 determines that the final score $e^*_n$ is a normal value (Inlier) and selects the sound source candidate as a sound source. The sound source selecting unit 164 outputs output sound source position information representing an estimated sound source position corresponding to the selected sound source to the outside of the audio processing device 1 through the output unit 18.

(Step S246) The sound source selecting unit 164 determines that the final score $e^*_n$ is an abnormal value (Outlier)

and rejects the corresponding sound source candidate without selecting it as a sound source. Thereafter, the process illustrated in FIG. 12 ends.

(Audio Processing)

The audio processing device 1 performs audio processing illustrated next as an example as a whole.

Figure 17:
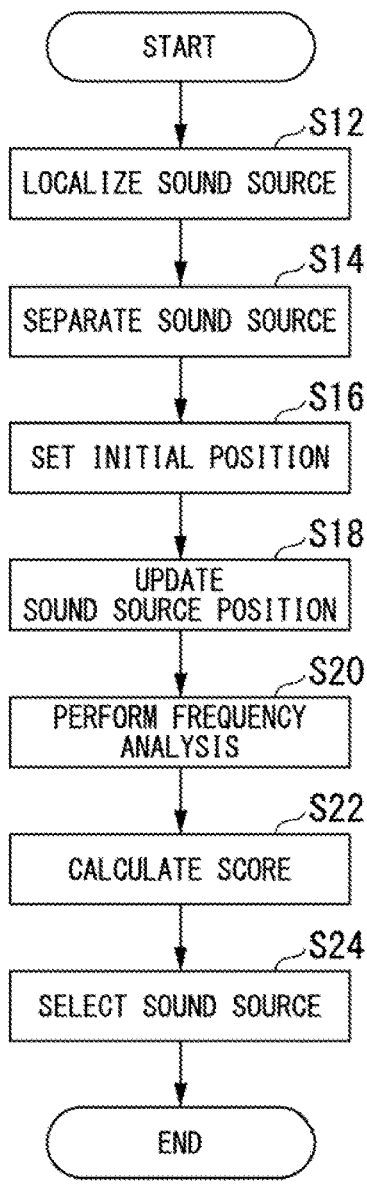
FIG. 17 is a flowchart illustrating one example of audio processing according to this embodiment.

FIG. 17 is a flowchart illustrating one example of audio processing according to this embodiment.

(Step S12) The sound source localizing unit 120 estimates a localized sound source direction of each sound source for every frame of which a length is set in advance on the basis of audio signals of a plurality of channels that are input from the input unit 10 and are acquired from each microphone array (sound source localization). The sound source localizing unit 120, for example, uses the MUSIC method in sound source localization. Thereafter, the process proceeds to the process of Step S14.

(Step S14) The sound source separating unit 122 separates an audio signal acquired from each microphone array into audio signals of individual sound sources for each sound source on the basis of the localized sound source direction for each sound source. The sound source separating unit 122, for example, uses the GHDSS method in the sound source separating unit. Thereafter, the process proceeds to the process of Step S16.

(Step S16) The initial value setting unit 140 sets a midpoint (included intersection) on the basis of a localized sound source direction estimated for a set of two microphone arrays among three microphone arrays using the triangle division method. The initial value setting unit 140 sets the set the midpoint as an initial value of the estimated sound source position of the sound source candidate. Thereafter, the process proceeds to the process of Step S18.

(Step S18) The sound source position updating unit 142 classifies a distribution of midpoints set on the basis of the estimated sound source direction for each set of two microphone arrays into a plurality of clusters. The sound source position updating unit 142 updates the estimated sound source positions such that a probability of an estimated sound source position for each sound source candidate belonging to a cluster corresponding to each sound source candidate increases. Here, the sound source position updating unit 142 performs the sound source position updating process described above. Thereafter, the process proceeds to the process of Step S20.

(Step S20) The frequency analyzing unit 124 calculates spectrums by performing a frequency analysis for audio signals of individual sound sources separated for each sound source for each microphone array. Thereafter, the process proceeds to the process of Step S22.

(Step S22) The dispersion calculating unit 160 classifies the calculated spectrums into a plurality of second clusters and determines whether or not sound sources relating to spectrums belonging to the classified second cluster are the same. The dispersion calculating unit 160 calculates dispersion of estimated sound source positions for each sound source candidate relating to the spectrum belonging to the second cluster. The score calculating unit 162 sets final scores for second clusters such that a second cluster relating to sound sources determined to be the same becomes larger than a second cluster relating to sound sources determined not to be the same. The score calculating unit 162 sets the final scores such that a final score becomes higher as a second cluster has a rare increase in the dispersion of estimated sound source positions for each repetition as the stability of the cluster. Here, the dispersion calculating unit 160 and the score calculating unit 162 perform the score calculating process described above. Thereafter, the process proceeds to the process of Step S24.

(Step S24) The sound source selecting unit 164 selects a sound source candidate corresponding to a second cluster of which the final score is equal to or high than a predetermined threshold of the final score as a sound source and rejects a sound source candidate corresponding to a second cluster of which the final score is lower than the threshold. The sound source selecting unit 164 outputs the estimated sound source position relating to the selected sound source. Thereafter, the process illustrated in FIG. 17 ends.

(Frame Data Analysis)

The audio processing system S1 includes the storage unit 19 and may store audio signals received by each microphone array before performing the audio processing illustrated in FIG. 17. The storage unit 19 may be configured as a part of the audio processing device 1 or may be installed in an external device separated from the audio processing device 1. The audio processing device 1 may perform the audio processing illustrated in FIG. 17 using audio signals read from the storage unit (batch processing).

The sound source position updating process (Step S18) and the score calculation process (Step S22) in the audio processing illustrated in FIG. 17 described above require various kinds of data based on audio signals of a plurality of frames and have long processing times. In an online process, when the process illustrated in FIG. 17 is completed for a certain frame, and then the process of a next frame is started, the output becomes intermittent, which is not realistic.

Thus, in an online process, the processes of Steps S12, S14, and S20 using the initial processing unit 12 may be performed in parallel with the processes of Steps S16, S18, S22, and S24 using the sound source position estimating unit 14 and the sound source identifying unit 16. In the processes of Steps S12 to S14 and S20, audio signals within a first section up to the current time point $t_0$ or various kinds of data derived from the audio signals are set as processing targets. In the processes of Steps S12, S14, and S20, audio signals within a first section up to the current time point to or various kinds of data derived from the audio signals are set as processing targets. In the processes of Steps S16, S18, S22, and S24, audio signals within a second section that is in the past from the first section or various kinds of data derived from the audio signals are set as processing targets.

Figure 18:
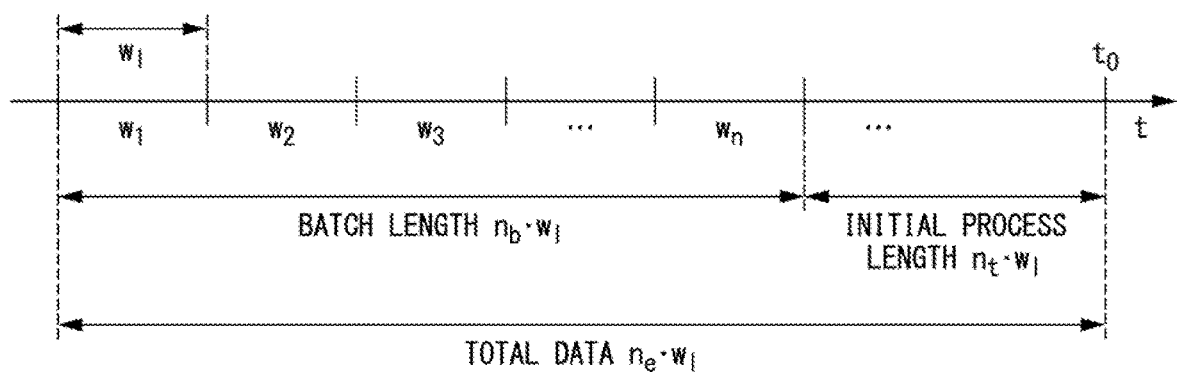
FIG. 18 is a diagram illustrating an example of a data section of a processing target.

FIG. 18 is a diagram illustrating an example of a data section of a processing target.

In FIG. 18, the horizontal direction represents a time. $t_0$ illustrated on the upper right side represents the current time point. $w_1$ represents a frame length of each of frames $w_1, w_2, \ldots$. A latest audio signal for each frame is input to the input unit 10 of the audio processing device 1, and the storage unit 19 of the audio processing device 1 stores audio signals of which a period is $n_e*wl$ and derived data. Then, the storage unit rejects an oldest audio signal and data for each frame. $n_e$ represents the number of frames of the entire data that is stored. The initial processing unit 12 performs processes of Steps S12 to S14 and S20 using data of the latest first section in the entire data. The length of the first section corresponds to an initial processing length $n_t*w_l$. $n_t$ represents the number of frames having an initial processing length set in advance. The sound source position estimating unit 14 and the sound source identifying unit 16 perform processes of Steps S16, S18, S22, and S24 using data of a second section that is after the end of the first section in the entire data. A length of the second section corresponds to a batch length $n_b*w_l$. $n_b$ represents the number of frames having a batch length set in advance. In the first section and the second section, for each frame, an audio signal of the latest frame, an audio signal of the $(n_r+1)$-th frame, and derived data are written. On the other hand, in the first section and the second section, for each frame, an audio signal of the $n_r$-th frame and data derived from the audio signal and an audio signal of the $n_e$-th frame and derived data are rejected. In this way, the initial processing unit 12, the sound source position estimating unit 14, and the sound source identifying unit 16 properly use data within the first section and data within the second section, and accordingly, the audio processing illustrated in FIG. 13 can be executed online such that the output continues between frames.

As described above, the audio processing device 1 according to this embodiment includes a sound source localizing unit that determines a localized sound source direction that is a direction of a sound source on the basis of audio signals of a plurality of channels acquired from M (here, M is an integer equal to or greater than "3") sound receiving units of which positions are different from each other and a sound source position estimating unit that estimates a midpoint of a segment perpendicular to both of half lines directed in estimated sound source directions that are directions toward the estimated sound source position of the sound source from each sound receiving unit for every set of two sound receiving unit as the estimated sound source position.

By employing such a configuration, although half lines directed in the localized sound source direction from sound receiving units different from each other do not intersect each other, a point determined using a midpoint (included intersection) of a segment perpendicular to both of the half lines can be estimated as an estimated sound source position.

In addition, in the audio processing device 1 according to this embodiment, the sound source position estimating unit described above classifies a distribution of the midpoints into a plurality of clusters, and the estimated sound source position described above corresponds to the sound source described above. The estimated sound source position is updated such that an estimation probability that is a probability of being classified into a cluster increases.

By employing such a configuration, the estimated sound source position is adjusted such that the possibility of the estimated sound source position of a corresponding sound source being classified into the range of a cluster classified into which a midpoint set in accordance with the localized sound source directions from sound receiving units 20 different from each other increases. Since the possibility of a sound source being present within the range of the cluster becomes high, the estimated sound source position that is adjusted can be acquired as a more accurate sound source position.

In addition, the estimation probability is a product having a first probability that is a probability of acquiring an estimated sound source direction when a localized sound source direction is determined, a second probability that is a probability of acquiring an estimated sound source position when a midpoint is determined, and a third probability that is a probability of appearance of a cluster into which a midpoint is classified as its factors.

Generally, while the localized sound source direction, the estimated sound source position, and the midpoint are interdependent, the sound source position estimating unit 14 can determine an estimated sound source position using the first probability, the second probability, and the third probability as factors of estimation probabilities that are independent. For this reason, a calculation load relating to the adjustment of the estimated sound source position is reduced.

Here, the first probability follows a von-Mises distribution having a localized sound source direction as a reference, the second probability follows a multi-dimensional Gaussian function having the position of a midpoint as a reference. The sound source position estimating unit 14 updates the shape parameter of the von-Mises distribution and the average and the dispersion of the multi-dimensional Gaussian function such that the estimation probability increases.

By employing such a configuration, each of the function of the estimated sound source direction of the first probability and the function of the sound source position of the second probability is represented by a small number of parameters such as the shape parameter or the average and the dispersion. For this reason, a calculation load relating to the adjustment of the estimated sound source position can be further reduced.

In addition, the sound source position estimating unit 14 sets the center of gravity of three midpoints (included intersections) determined by three sound receiving units 20 as an initial value of the estimated sound source position.

By employing such a configuration, the initial value of the estimated sound source position can be set inside of the area of a triangle having three midpoints at which there is a high possibility of presence of a sound source as its vertexes. For this reason, a calculation load until a change in the estimated sound source position according to adjustment converges is reduced.

In addition, the audio processing device 1 includes the sound source separating unit 122 that separates audio signals of a plurality of channels into individual sound source signals for sound sources and the frequency analyzing unit 124 that calculates a spectrum of the individual sound source signal. The audio processing device 1 includes the sound source identifying unit 16 that classifies the calculated spectrums into a plurality of second clusters, determines whether or not sound sources relating to each spectrum classified into each second cluster are the same and selects an estimated sound source position of sound sources determined to be the same with priority over sound sources determined not to be the same.

By employing such a configuration, the possibility of an estimated sound source position, which is estimated on the basis of a midpoint in the localized sound source directions of sound sources determined not to be the same on the basis of the spectrum, being rejected increases. For this reason, the possibility of an estimated sound source position being erroneously selected as a virtual image (ghost) on the basis of a midpoint in the estimated sound source directions of sound sources that are different from each other can be lowered.

The sound source identifying unit 16 evaluates a stability of a second cluster on the basis of dispersion of an estimated sound source position of a sound source relating to a spectrum classified into each second cluster and selects an estimated sound source position of a sound source of which the spectrum is classified into a second cluster with priority as the stability of the second cluster becomes higher.

By employing such a configuration, the possibility of an estimated sound source position of a sound source corresponding to a second cluster to which a spectrum of a sound source of which an estimated sound source position is stationary is classified being selected becomes high. In other words, the possibility of an estimated sound source position estimated on the basis of a midpoint in estimated sound source directions of mutually-different sound sources accidently being included in a second cluster in which the estimated sound source position is selected is lowered. For this reason, the possibility of erroneously selecting an estimated sound source position as a virtual image on the basis of a midpoint in the estimated sound source directions of mutually-different sound sources can be further lowered.

(Measurement Result)

Next, an example of results measured using the audio processing device 1 according to this embodiment will be described.

First, an example of arrangement of microphone arrays will be described.

Figure 19:
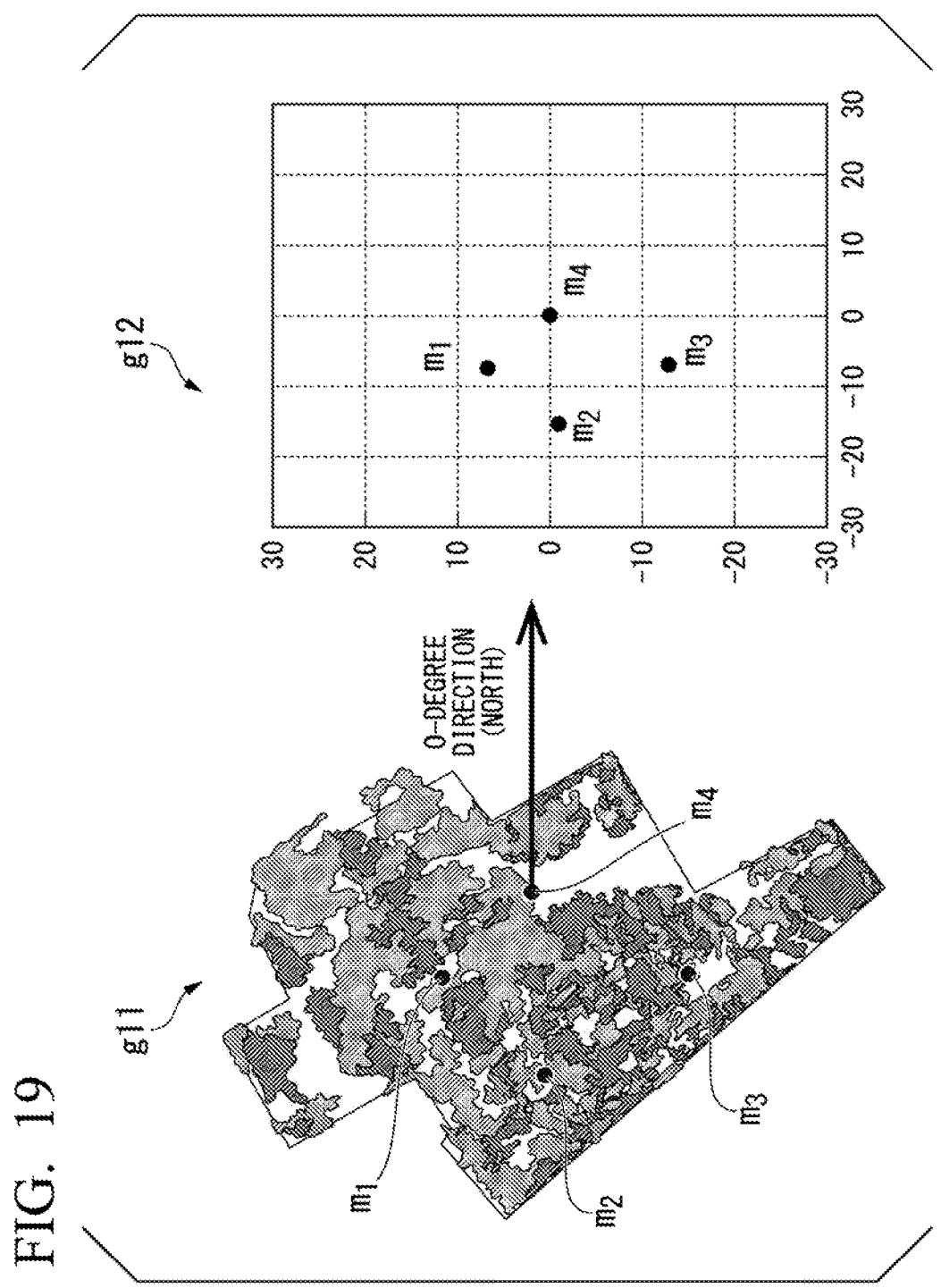
FIG. 19 is a diagram illustrating an example of arrangement of microphone arrays.

FIG. 19 is a diagram illustrating an example of arrangement of microphone arrays. In FIG. 19, microphone arrays $m_1$, $m_2$, $m_3$, and $m_4$ are illustrated.

In addition, an image g11 illustrates arrangement of the microphone arrays $m_1$, $m_2$, $m_3$, and $m_4$ in a real space. In addition, microphone array installation coordinates g12 in an xy plane are illustrated. In FIG. 19, an x axis is taken in a horizontal direction toward the north side, a y axis is taken in the vertical direction toward the west side, and a z axis is taken in a perpendicular direction toward the upper side. In addition, the origin is the position of the microphone array $m_4$. Regarding a height z, the ground surface of a position T1 is used as a reference (z=0) all the time regardless of x and y. In addition, the north side is set as the direction of 0-degree azimuth in the xy plane. Furthermore, a ground height of each microphone array is 1.3 m. In addition, in each of the used microphone arrays, 16 microphones are dispersedly arranged at different vertical and horizontal positions on surfaces of the devices. In such an environment, songs of a birds for several hours were recorded.

Figure 20:
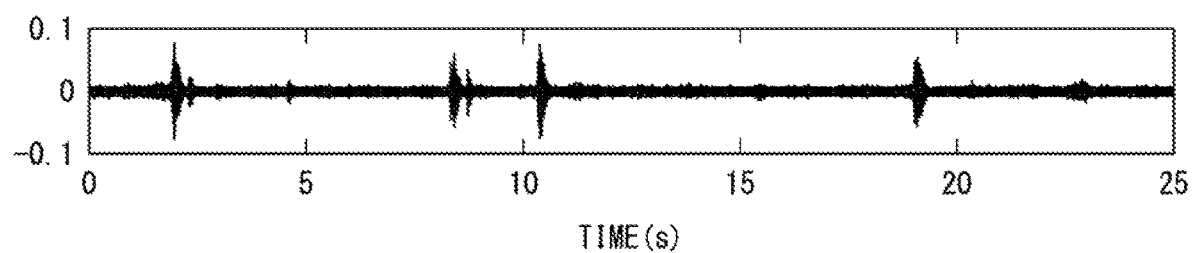
FIG. 20 is a diagram illustrating an example of a first audio signal that has been received.

FIG. 20 is a diagram illustrating an example of a first audio signal that has been received. In FIG. 20, the horizontal axis is time, and the vertical axis is the magnitude of an audio signal. In addition, received the audio signal was a birdcall of a wild bird. The recording time is 25 seconds. For this received audio signal, the estimation of a three-dimensional position described above and an outliner removing (ghost removing) process were performed.

As illustrated in FIG. 20, this data is composed of four large crying sound events, and noises of a passing car, bird cry at a remote place, and the like are included.

Figure 21:
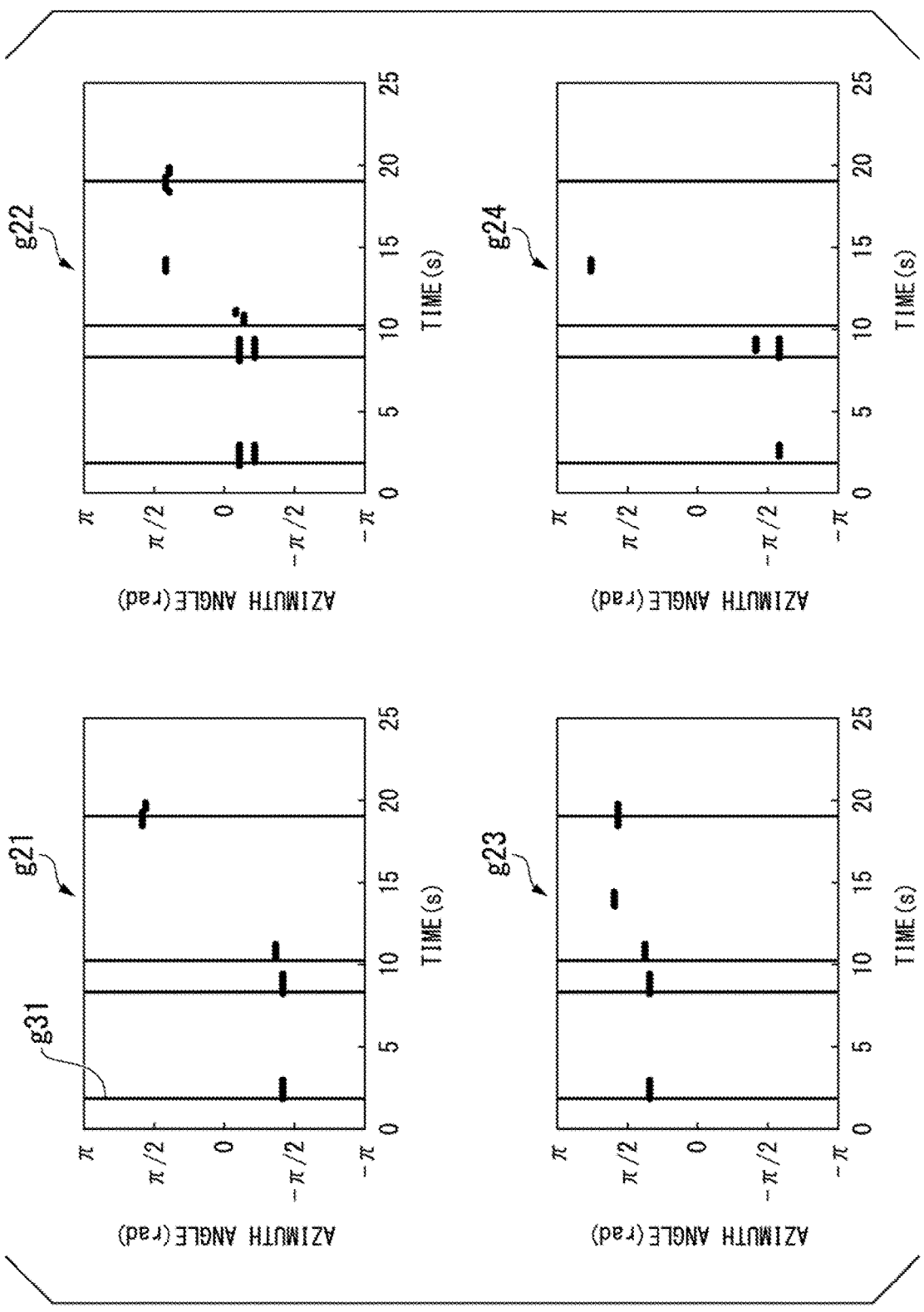
FIG. 21 is a result of an analysis of each of first audio signals received by the microphone arrays $m_1$, $m_2$, $m_3$, and $m_4$.

FIG. 21 is a result of an analysis of each of first audio signals received by the microphone arrays $m_1$, $m_2$, $m_3$, and $m_4$. A result g21 of an analysis of an audio signal received by the microphone array mi is illustrated. In addition, a result g22 of an analysis of an audio signal received by the microphone array $m_2$ is illustrated. Furthermore, a result g23 of an analysis of an audio signal received by the microphone array $m_3$ is illustrated. In addition, a result g24 of an analysis of an audio signal received by the microphone array $m_4$ is illustrated. In the results g21 to g24, the horizontal axis is time, and the vertical axis is azimuth angle (rad). In addition, a vertical line g31 or the like represents an approximate start time of each event.

As illustrated in FIG. 21, an event could be appropriately estimated using microphone arrays $m_1$, $m_2$, and $m_3$ accompanying several noise events that could not be removed through an outliner removing algorithm.

Although several main events are omitted in the microphone array $m_4$, localization can be executed using information from the other three microphone arrays.

FIG. 22 is an example illustrating positions of birds estimated on the basis of the audio signal illustrated in FIG. 20.

In FIG. 22, an estimated position g31 in an XY plane is illustrated, the horizontal axis is an X(m) axis, and a vertical axis is a Y(m) axis. An estimated position g32 in an XZ plane is illustrated, the horizontal axis is an X(m) axis, and the vertical axis is a Z(m) axis. An estimated position g33 in a YZ plane is illustrated, the horizontal axis is an Y(m) axis, and the vertical axis is a Z(m) axis.

In addition, a circular mark represents a normal value. An X mark represents an abnormal value. A triangular mark represents a position of a microphone array.

For the second data, recording of singing of another bird was selected for every 22 seconds with the same setting as that of the initial data.

Figure 23:
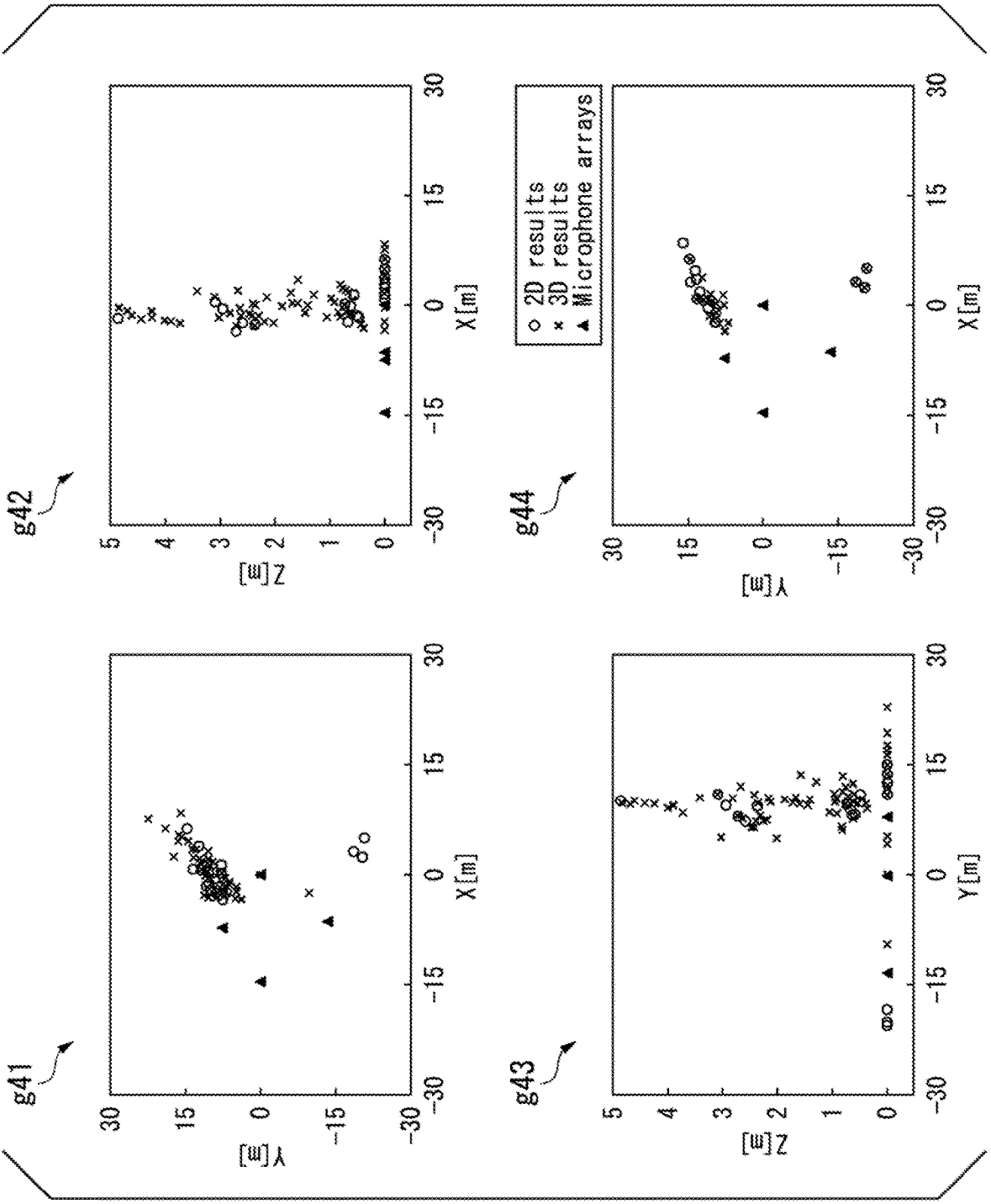
FIG. 23 is an example illustrating positions of a bird estimated on the basis of a second audio signal.

FIG. 23 is an example illustrating positions of a bird estimated on the basis of a second audio signal (not illustrated in the drawing).

In FIG. 23, an estimated position g41 in an XY plane acquired through three-dimensional position estimation according to this embodiment is illustrated, the horizontal axis is an X(m) axis, and the vertical axis is a Y(m) axis. An estimated position g42 in an XY plane acquired through three-dimensional position estimation according to this embodiment is illustrated, the horizontal axis is an X(m) axis, and the vertical axis is a Z(m) axis. An estimated position g43 in a YZ plane acquired through three-dimensional position estimation according to this embodiment is illustrated, the horizontal axis is a Y(m) axis, and the vertical axis is a Z(m) axis. A comparison g44 between a result of two-dimensional position estimation using a conventional technology and a result of three-dimensional position estimation according to this embodiment is illustrated, the horizontal axis is an X(m) axis, and the vertical axis is a Y(m) axis.

In addition, in the estimated positions g41 to g43, a circular mark represents a normal value, an X mark represents an abnormal value, and a triangular mark represents a position of a microphone array.

In the comparison g44, a circular mark represents a result of two-dimensional position estimation using a conventional technology, an X mark represents a result of three-dimensional position estimation according to this embodiment, and a triangular mark represents a position of a microphone array.

In the example illustrated in FIG. 23, while it is seen as if several birds are crying, the birds are positioned at the same position XY and different heights. For this reason, since only an azimuth angle direction is used in the two-dimensional position estimation using the conventional technology, only a position of one bird that is crying is estimated as a result.

On the other hand, also a difference between heights of positions of birds can be analyzed as a result of performing the three-dimensional position estimation according to this embodiment.

FIG. 24 is a diagram illustrating a result of a comparison between a result of estimation of a two-dimensional position according to a conventional technology and a result of estimation of a three-dimensional position according to this embodiment.

The result g51 of the two-dimensional position estimation using the conventional technology in an XY plane, the horizontal axis is X(m), and the vertical axis is Y(m). Estimated positions g41 and g42 are the same as those illustrated in FIG. 23. In the result g51, a circular mark represents a normal value, an X mark represents an abnormal value, and a triangular mark represents a position of a microphone array.

A result acquired by superimposing the result g51 and the estimated position g41 is a diagram of the comparison g44 illustrated in FIG. 23. As illustrated in the result g51 and the estimated position g41, when seen from above (the XY plane), the estimated positions of birds are seen to be the same. However, as illustrated in the estimated position g42, it can be understood that birds are crying at different heights.

Figure 25:
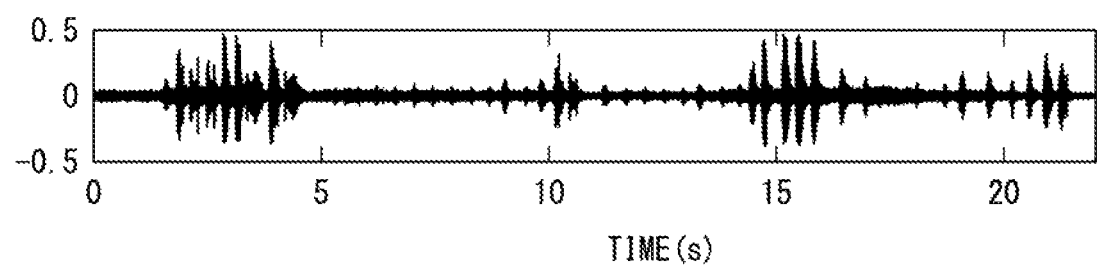
FIG. 25 is a diagram illustrating an example of one channel of a second audio signal that has been received.

FIG. 25 is a diagram illustrating an example of one channel of a second audio signal that has been received. In FIG. 25, the horizontal axis is time, and the vertical axis is magnitude of an audio signal. In addition, the received audio signal is a crying sound of a wild bird. The recording time is 22 seconds. For this received audio signal, the three-dimensional position estimation and the outliner removing (ghost removing) process were performed.

Figure 26:
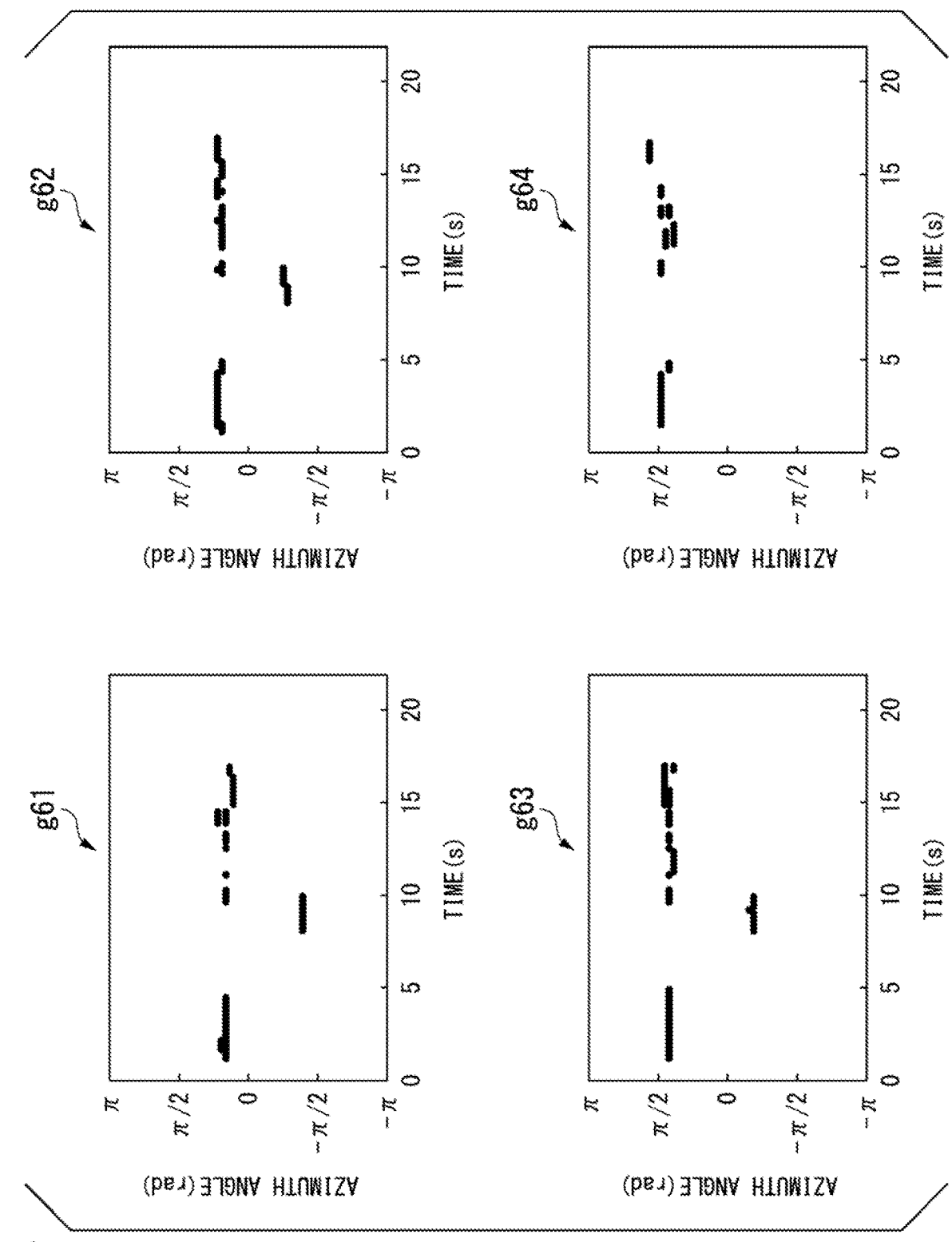
FIG. 26 is a result of an analysis of an azimuth angle direction for each of second audio signals received by the microphone arrays $m_1$, $m_2$, $m_3$, and $m_4$.

FIG. 26 is a result of an analysis of an azimuth angle direction for each of second audio signals received by the microphone arrays $m_1$, $m_2$, $m_3$, and $m_4$. A result g61 of an analysis of an audio signal received by the microphone array mi is illustrated. In addition, a result g62 of an analysis of an audio signal received by the microphone array $m_2$ is illustrated. Furthermore, a result g63 of an analysis of an audio signal received by the microphone array $m_3$ is illustrated. In addition, a result g64 of an analysis of an audio signal received by the microphone array $m_4$ is illustrated. In the results g61 to g64, the horizontal axis is time, and the vertical axis is an azimuth angle (rad).

Figure 27:
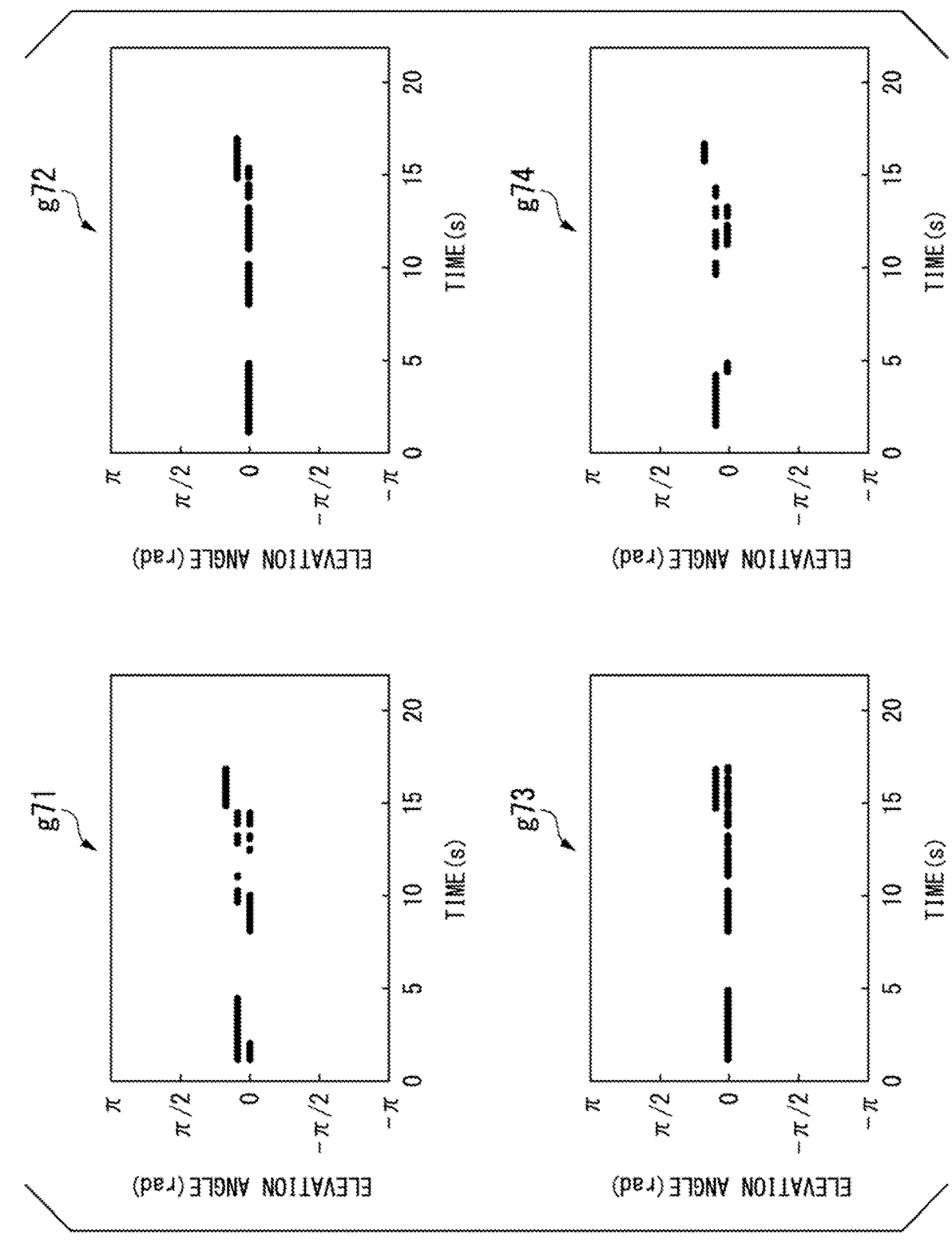
FIG. 27 is a result of an analysis of an elevation angle direction for each of second audio signals received by the microphone arrays $m_1$, $m_2$, $m_3$, and $m_4$.

FIG. 27 is a result of an analysis of an elevation angle direction for each of second audio signals received by the microphone arrays $m_1$, $m_2$, $m_3$, and $m_4$. A result g71 of an analysis of an audio signal received by the microphone array mi is illustrated. In addition, a result g72 of an analysis of an audio signal received by the microphone array $m_2$ is illustrated. Furthermore, a result g73 of an analysis of an audio signal received by the microphone array $m_3$ is illustrated. In addition, a result g74 of an analysis of an audio signal received by the microphone array $m_4$ is illustrated. In the results g71 to g74, the horizontal axis is time, and the vertical axis is an elevation angle (rad).

In the examples illustrated in FIGS. 26 and 17, the events of birds are almost constant, and it was difficult to determine accurate start times of such events.

In addition, in most cases, information is acquired simultaneously with an event of a main audio signal of recorded data.

As illustrated in the measurement results presented above, according to this embodiment, birds positioned at different heights can be distinguished from each other through three-dimensional position estimation. In addition, by using the measurement results, it can be considered that the estimated position of a bird is valid on the basis of the position and the height of trees.

As above, while the embodiment of the present invention has been described with reference to the drawings, a specific configuration is not limited to that described above, and various design changes and the like may be made within the range not departing from the concept of the present invention.

For example, the dispersion calculating unit 160 may perform the processes of Steps S222 and S224 among the processes illustrated in FIG. 15 and may not perform the processes of Steps S226 to S240. In such a case, the score calculating unit 162 may be omitted. In such a case, the sound source selecting unit 164 may select a candidate sound source corresponding to a second cluster for which sound sources relating to a spectrum classified into the second cluster are determined to be the same as a sound source and reject a candidate sound source corresponding to a second cluster for which sound sources are determined not to be the same. The sound source selecting unit 164 outputs output sound source position information representing an estimated sound source position corresponding to the selected sound source to the outside of the audio processing device 1.

In addition, the frequency analyzing unit 124 and the sound source identifying unit 16 may be omitted in the audio processing device 1. In such a case, the sound source position updating unit 142 outputs estimated sound source position information representing an estimated sound source position for each sound source candidate to the output unit 18.

The audio processing device 1 may be configured as a single device in which the sound receiving units 20-1 to 20-M are integrated.

The number M of the sound receiving units 20 is not limited to three and may be four or more. In addition, the number of channels of audio signals that can be received may be different, and the number of sound sources that can be estimated from each audio signal may be different for each sound receiving unit 20.

A probability distribution that the first probability follows is not limited to the von-Mises distribution and may be a one-dimensional probability distribution giving a maximum value for a certain reference value within a one-dimensional space such as a derivative of a logistic function.

A probability distribution that the second probability follows is not limited to the multi-dimensional Gaussian function and may be a multi-dimensional probability distribution giving a maximum value for a certain reference value within a multi-dimensional space such as a derivative of a multi-dimensional logistic function.

In addition, by recording a program used for realizing some or all of the functions of the audio processing device 1 according to the present invention in a computer-readable recording medium and causing a computer system to read and execute the program recorded in the recording medium, some or all of the processes performed by the audio processing device 1 may be performed. The "computer system" described here includes an OS and hardware such as a peripheral apparatus. In addition, the "computer system" is assumed to also include a WWW system including a homepage providing environment (or display environment). The "computer-readable recording medium" represents a storage device such as a portable medium including a flexible disk, a magneto-optical disk, a ROM, a CD-ROM, and the like, a hard disk built into a computer system, or the like. Furthermore, the "computer-readable recording medium" includes a medium storing a program for a fixed time such as a volatile memory (RAM) disposed inside a computer system that becomes a server or a client in a case in which a program is transmitted through a network such as the internet or a communication line such as a telephone line.

The program described above may be transmitted from a computer system storing this program in a storage device or the like to another computer system through a transmission medium or a transmission wave in a transmission medium. Here, the "transmission medium" transmitting a program represents a medium having an information transmitting function such as a network (communication network) including the Internet and the like or a communication line (communication wire) including a telephone line. The program described above may be used for realizing a part of the functions described above. In addition, the program described above may be a program realizing the functions described above by being combined with a program recorded in the computer system in advance, a so-called a differential file (differential program).

What is claimed is:

1. An audio processing device comprising:
a sound source localizing unit configured to determine a localized sound source direction, which is a direction of a sound source, on the basis of audio signals of a plurality of channels acquired from M (here, M is an integer equal to or greater than "3") sound receiving units of which positions are different from each other; and
a sound source position estimating unit configured to, for each set of two sound receiving units among the M sound receiving units, estimate a midpoint of a segment perpendicular to both of two half lines directed in estimated sound source directions, which are directions from the two sound receiving units to an estimated sound source position of the sound source, as the estimated sound source position.

2. The audio processing device according to claim 1, wherein the sound source position estimating unit classifies a distribution of the midpoints into a plurality of midpoint clusters and updates the estimated sound source position such that an estimation probability, which is a probability of the estimated sound source position being classified into the midpoint cluster corresponding to the sound source, increases.

3. The audio processing device according to claim 2, wherein the estimation probability is a product having a first probability that is a probability of acquiring the estimated sound source direction when the localized sound source direction is determined, a second probability that is a probability of acquiring the estimated sound source position when the midpoint is determined, and a third probability that is a probability of appearance of the midpoint cluster into which the midpoint is classified as factors.

4. The audio processing device according to claim 3, wherein the first probability follows a von-Mises distribution having the localized sound source direction as a reference, and the second probability follows a multi-dimensional Gaussian function having a position of the midpoint as a reference, and
wherein the sound source position estimating unit updates a shape parameter of the von-Mises distribution and an average and dispersion of the multi-dimensional Gaussian function such that the estimation probability increases.

5. The audio processing device according to claim 1, wherein the sound source position estimating unit sets a center of gravity of three midpoints determined from three sound receiving units as an initial value of the estimated sound source position.

6. The audio processing device according to claim 1, further comprising:
a sound source separating unit configured to separate the audio signals of the plurality of channels into individual sound source signals for sound sources;
a frequency analyzing unit configured to calculate spectrums of the individual sound source signals; and
a sound source identifying unit configured to classify the spectrums into a plurality of spectrum clusters, determine whether or not sound sources relating to the spectrums that are classified into the spectrum clusters are the same, and select the estimated sound source position of sound sources determined to be the same with priority over sound sources determined not to be the same.

7. The audio processing device according to claim 6, wherein the sound source identifying unit evaluates a stability of the spectrum cluster on the basis of a dispersion of the estimated sound source positions of the sound sources relating to the spectrums classified into the spectrum clusters and selects the estimated sound source position of the sound source of which the spectrum is classified into the spectrum cluster with higher priority when the spectrum cluster has a higher stability.

8. An audio processing method in an audio processing device, the audio processing method comprising:
a sound source localizing process of determining a localized sound source direction, which is a direction of a sound source, on the basis of audio signals of a plurality of channels acquired from M (here, M is an integer equal to or greater than "3") sound receiving units of which positions are different from each other; and
a sound source position estimating process of estimating a midpoint of a segment perpendicular to both of two half lines directed in estimated sound source directions for each set of two sound receiving units among the M sound receiving units, which are directions from the sound receiving units to an estimated sound source position of the sound source, as the estimated sound source position.

9. A computer-readable non-transitory storage medium storing a program thereon, the program causing a computer of an audio processing device to execute:
a sound source localizing sequence of determining a localized sound source direction, which is a direction of a sound source, on the basis of audio signals of a plurality of channels acquired from M (here, M is an integer equal to or greater than "3") sound receiving units of which positions are different from each other; and
a sound source position estimating sequence of estimating a midpoint of a segment perpendicular to both of two half lines directed in estimated sound source directions for each set of two sound receiving units among the M sound receiving units, which are directions from the sound receiving units to an estimated sound source position of the sound source, as the estimated sound source position.

* * * * *